United States Patent
Kano et al.

(10) Patent No.: US 7,393,296 B2
(45) Date of Patent: Jul. 1, 2008

(54) HYBRID DRIVING UNIT AND VEHICLE CARRYING THE SAME

(75) Inventors: Seigo Kano, Aichi-ken (JP); Kenji Omote, Aichi-ken (JP); Satoru Wakuta, Aichi-ken (JP); Tomochika Inagaki, Aichi-ken (JP); Masatoshi Adachi, Aichi-ken (JP); Masahiro Kojima, Aichi-ken (JP)

(73) Assignees: Toyota Jidosha Kabushiki Kaisha, Aichi-Ken (JP); Aisin AW Co., Ltd., Aichi-Ken (JP)

( * ) Notice: Subject to any disclaimer, the term of this patent is extended or adjusted under 35 U.S.C. 154(b) by 213 days.

(21) Appl. No.: 10/536,832

(22) PCT Filed: Jun. 30, 2004

(86) PCT No.: PCT/JP2004/009200

§ 371 (c)(1),
(2), (4) Date: Dec. 8, 2005

(87) PCT Pub. No.: WO2005/000619

PCT Pub. Date: Jan. 6, 2005

(65) Prior Publication Data

US 2006/0166772 A1    Jul. 27, 2006

(30) Foreign Application Priority Data

Jun. 30, 2003    (JP) .................. 2003-189104

(51) Int. Cl.
*B60K 6/20*    (2007.10)

(52) U.S. Cl. .................. 475/5; 475/10; 475/151; 903/911

(58) Field of Classification Search .................. 475/5, 475/10, 149, 151; 903/910, 911; 180/65.7
See application file for complete search history.

(56) References Cited

U.S. PATENT DOCUMENTS

| | | | |
|---|---|---|---|
| 3,623,568 A | 11/1971 | Mori | |
| 5,904,631 A | 5/1999 | Morisawa et al. | |
| 6,358,173 B1 * | 3/2002 | Klemen et al. | 475/5 |
| 7,223,200 B2 * | 5/2007 | Kojima et al. | 477/3 |
| 2003/0064854 A1 | 4/2003 | Kotani | |

(Continued)

FOREIGN PATENT DOCUMENTS

DE    197 17 884 A1    2/1998

(Continued)

*Primary Examiner*—Sherry Estremsky
*Assistant Examiner*—Edwin A Young
(74) *Attorney, Agent, or Firm*—Sughrue Mion, PLLC

(57) ABSTRACT

A hybrid driving unit (7) in which a second electric motor (23) is disposed on the side closer to the front of a vehicle (the side closer to an internal combustion engine (5)) than a first electric motor (20). A casing member (14) is formed such that an inner diameter of a part thereof, in which a stator (28) of the second electric motor (23) is fixed, is larger than that of a part in which a stator of the first electric motor (20) is fixed. This allows the second electric motor (23) to be constructed so as to have a large radial dimension and, to that extent, allows the length thereof in the longitudinal direction to be suppressed. Accordingly, this allows the length of the whole hybrid driving unit (7) to be shortened.

23 Claims, 5 Drawing Sheets

U.S. PATENT DOCUMENTS

| | | |
|---|---|---|
| 2003/0078134 A1 | 4/2003 | Kojima et al. |
| 2004/0084233 A1 | 5/2004 | Wakuta et al. |

FOREIGN PATENT DOCUMENTS

| | | |
|---|---|---|
| GB | 2 078 016 A | 12/1981 |
| JP | 47-31773 | 8/1972 |
| JP | 06-144020 A | 5/1994 |
| JP | 07-135701 A | 5/1995 |
| JP | 08-183347 A | 7/1996 |
| JP | 10-058990 A | 3/1998 |
| JP | 10-58990 A | 3/1998 |
| JP | 2000-346187 A | 12/2000 |
| JP | 2002-225578 A | 8/2002 |
| JP | 2003-191761 A | 7/2003 |
| WO | WO 03/055709 A1 | 12/2002 |

* cited by examiner

HYBRID DRIVING UNIT AND VEHICLE CARRYING THE SAME

TECHNICAL FIELD

The present invention relates to a vehicular hybrid driving unit and a vehicle carrying the same and, more specifically, to a layout of two electric motors, a power-splitting planetary gear and a transmission disposed within a casing member.

BACKGROUND

Hitherto, there has been known a so-called mechanical power-splitting (split type or two-motor type) hybrid driving unit, to be mounted in a vehicle, in which an engine, a generator and a driving (assist) electric motor are connected, respectively, to three elements of a planetary gear. The driving electric motor is coupled with an output shaft, output torque of the above-mentioned planetary gear is continuously controlled through control of the generator, and torque of the other driving electric motor is combined with the output torque of the planetary gear to be outputted to the output shaft as necessary.

A hybrid driving unit like that described above is disclosed, for instance, in Japanese Patent Laid-Open No. Hei. 08-183347 as a unit for a front-engine and front-drive (hereinafter "FF") type vehicle and in Japanese Patent Laid-Open No. 2002-225578 as a unit provided with a transmission between an electric motor and an output shaft.

The position and direction of the hybrid driving unit to be mounted and the shape of a casing member vary from those of the FF type vehicle in mounting such unit to a front-engine and rear-drive (hereinafter "FR") vehicle.

For instance, in the FR-type vehicle, an internal combustion engine, the hybrid driving unit and a propeller shaft are disposed approximately on one and the same axial line, in order, from the front side of the vehicle in the longitudinal direction of the vehicle's body. The hybrid driving unit is stored in a cylindrical casing member such that two electric motors (power generating first electric motor and a driving second electric motor), a power-splitting mechanism, a transmission and others are disposed at different positions on one and the same axial line.

From the aspect of mountability to the body, it is preferable to form the hybrid driving unit such that the front end thereof, which is coupled with the internal combustion engine, is thick and the rear end thereof, which is on the side of the propeller shaft, is thin. Further, with regard to the two electric motors described above, the radial dimension of the driving electric motor is apt to be larger than that of the power generating electric motor because the driving electric motor must generate a large torque in starting the vehicle. It is noted that if the radial dimension of the driving electric motor is suppressed, the length thereof in the longitudinal direction needs to be extended in order to assure high torque required in starting the vehicle. Accordingly, the length of the whole hybrid driving unit in the longitudinal direction also needs to be extended, thus degrading the mountability to the body.

SUMMARY OF THE PRESENT INVENTION

Accordingly, it is an aspect of the present invention to provide a hybrid driving unit, and a vehicle carrying the same, which ensures high torque while improving its mountability, thus solving the aforementioned problems and others, by disposing a second electric motor on the side of the vehicle closer to the front, i.e., on the side closer to an internal combustion engine, than a first electric motor.

According to a first aspect of the present invention, a hybrid driving unit comprises:
an input shaft for inputting motive power from an internal combustion engine; an output shaft disposed on an axis in line with the input shaft and engaged with driving wheels; a first electric motor disposed on the axis and having a stator and a rotor; a power-splitting planetary gear disposed on the axis and having a first rotary element coupled with the input shaft, a second rotary element coupled with the rotor of the first electric motor and a third rotary element coupled with the output shaft; a second electric motor disposed on the axis and having a stator and a rotor; and a transmission disposed on the axis, which shifts and transmits revolution of the rotor of the second electric motor to the output shaft; wherein
the first electric motor, the power-splitting planetary gear, the second electric motor and the transmission are provided in a casing member while being disposed in line on the axis;
wherein the stators of the first and second electric motors are fixed to the casing member; and
wherein the first electric motor, the power-splitting planetary gear, the second electric motor and the transmission are disposed on the axis such that the second electric motor is positioned on a side of a vehicle closer to the internal combustion engine than the first electric motor.

According to a second aspect of the present invention, a hybrid driving unit is provided, wherein the second electric motor is disposed in a foremost position in a vehicle among the first electric motor, the power-splitting planetary gear, the second electric motor and the transmission.

According to a third aspect of the present invention, a hybrid driving unit is provided, wherein the transmission is provided adjacent to the second electric motor.

According to a fourth aspect of the present invention, a hybrid driving unit is provided wherein supporting members extending from the casing member support both sides of the rotor of the second electric motor through an intermediary of bearing members; and wherein one of the supporting members, which is between the second electric motor and the transmission, forms a hydraulic chamber of a hydraulic actuator of the transmission.

According to a fifth aspect of the present invention, a hybrid driving unit is provided wherein at least a part of the hydraulic chamber is provided on an inner diametric side of the stator (coil end) of the second electric motor.

According to a sixth aspect of the present invention, a hybrid driving unit is provided wherein the second electric motor, the transmission, the power-splitting planetary gear and the first electric motor are disposed in order from a side of a vehicle that is closest to the internal combustion engine.

According to a seventh aspect of the present invention, a hybrid driving unit is provided wherein the input shaft passes through an inner peripheral side of the second electric motor and the transmission; wherein said input shaft is coupled with a first rotary element, wherein the output shaft passes through an inner peripheral side of the power-splitting planetary gear and the first electric motor; and wherein said output shaft is coupled with an output element of the transmission through an outer peripheral side of the power-splitting planetary gear.

According to an eighth aspect of the present invention, the hybrid driving unit is provided wherein power-splitting planetary gear comprises a double pinion planetary gear train; wherein the input shaft passes between the transmission and the power-splitting planetary gear; wherein the input shaft is coupled with a ring gear of the double pinion planetary gear train; wherein the output shaft is coupled with a carrier of the double pinion planetary gear train on a side of the transmission through the inner peripheral side of the power-splitting planetary gear; wherein the rotor of the first electric motor is coupled with a sun gear the double pinion planetary gear; wherein the output element of the transmission is coupled with the carrier of the double pinion planetary gear train on a side of the first electric motor through an outer peripheral side of the power-splitting planetary gear.

According to a ninth aspect of the present invention, a hybrid driving unit is provided wherein supporting members extending from the casing member support both sides of the rotor of the first electric motor through an intermediary of bearing members; and wherein the output shaft is supported by an inner peripheral surface of the rotor of the first electric motor through an intermediary of bearing members provided at an outer peripheral surface of the output shaft.

According to a tenth aspect of the present invention a hybrid driving unit is provided wherein the supporting members extending from the casing member support both sides of the rotor of the second electric motor through an intermediary of the bearing members and the input shaft is supported by an inner peripheral surface of the rotor of the second electric motor through an intermediary of a bearing members provided at the outer peripheral surface of the input shaft.

According to an eleventh aspect of the present invention, a hybrid driving unit is provided wherein the second electric motor, the transmission, the first electric motor and the power-splitting planetary gear are disposed in order from a side of a vehicle closest to the internal combustion engine.

According to a twelfth aspect of the present invention, a hybrid driving unit is provided wherein the input shaft passes through an inner peripheral side of the second electric motor, the transmission, the first electric motor and the power-splitting planetary gear; wherein the input shaft is coupled with the first rotary; wherein the output shaft passes through an outer peripheral side of the power-splitting planetary gear; and wherein an output element of the transmission passes through an inner peripheral side of the first electric motor and the power-splitting planetary gear; and wherein said output element is coupled with the output shaft.

According to a thirteenth aspect of the present invention, the hybrid driving unit is provided wherein the power-splitting planetary gear comprises a double pinion planetary gear train; the input shaft is coupled with a ring gear of the double pinion planetary gear train through a back side of the power-splitting planetary gear; wherein the output shaft is coupled with the carrier of the double pinion planetary gear train on a side of the first electric motor; wherein the rotor of the first electric motor is coupled with the sun gear of the double pinion planetary gear train; and wherein the output element of the transmission is coupled with the rear side of the carrier of the double pinion planetary gear train through the inner peripheral side of the power-splitting planetary gear.

According to a fourteenth aspect of the present invention, a hybrid driving unit is provided wherein supporting members extending from the casing member support both sides of the rotor of the first electric motor through an intermediary of bearing members; and wherein an output element of the transmission is supported by an inner peripheral surface of the rotor of the first electric motor through an intermediary of bearing members provided on an outer peripheral surface thereof.

According to a fifteenth aspect of the present invention, a hybrid driving unit is provided wherein supporting members extending from the casing member support both sides of the rotor of the second electric motor through an intermediary of the bearing members; and wherein the input shaft is supported by an inner peripheral surface of the rotor of the second electric motor and by an inner peripheral surface of the output element of the transmission through an intermediary of bearing members provided on an outer peripheral surface of the input shaft.

According to a sixteenth aspect of the present invention, hybrid driving unit is provided wherein one of the supporting members between the second electric motor and the transmission, forms a hydraulic chamber of a hydraulic actuator of the transmission.

According to a seventeenth aspect of the present invention, a hybrid driving unit is provided wherein the transmission comprises a planetary gear unit.

According to an eighteenth aspect of the present invention, a hybrid driving unit is provided wherein the transmission comprises at least four shifting elements; wherein a first shifting element is coupled with the rotor of the second electric motor; wherein a second shifting element is coupled with the output shaft; and wherein the transmission comprises braking elements which are capable of fixing a third shifting element and a fourth shifting element to the casing member.

According to a nineteenth aspect of the present invention, a hybrid driving unit is provided wherein the planetary gear unit of the transmission comprises a Ravigneaux type planetary gear; and wherein a carrier of the Ravigneaux type planetary gear is coupled with the output shaft.

According to a twentieth aspect of the present invention, a vehicle is provided comprising an internal combustion engine; a hybrid driving unit; and driving wheels to which a driving force is transmitted from the hybrid driving unit; wherein the hybrid driving unit comprises: an input shaft for inputting motive power from said internal combustion engine; an output shaft disposed on an axis in line with said input shaft and engaged with driving wheels; a first electric motor disposed on said axis and having a stator and a rotor; a power-splitting planetary gear disposed on said axis and having a first rotary element coupled with said input shaft, a second rotary element coupled with said rotor of said first electric motor and a third rotary element coupled with said output shaft; a second electric motor disposed on said axis and having a stator and a rotor; and a transmission disposed on said axis which shifts and transmits a revolution of said rotor of said second electric motor to said output shaft; wherein said first electric motor, said power-splitting planetary gear, said second electric motor and said transmission are provided in a casing member while being disposed in line on said axis; wherein said stators of said first and second electric motors are fixed to said casing member; and wherein said first electric motor, said power-splitting planetary gear, said second electric motor and said transmission are disposed on said axis such that said second electric motor is positioned on a side of a vehicle closer to said internal combustion engine than said first electric motor.

According to a twenty-first aspect of the present invention, a vehicle is provided wherein the input shaft is coupled with a crankshaft of the internal combustion engine; a propeller shaft is coupled with the output shaft; and wherein the crankshaft of the internal combustion engine, the input shaft, the output shaft and the propeller shaft are disposed approximately on the same axial line.

According to the first aspect of the present invention, the second electric motor which must output a greater torque than that of the first electric motor may be arranged so as to have a large radial dimension (as compared to that of the first electric motor) by disposing the second electric motor on a side closer to the front of the vehicle (i.e., the side closer to the internal combustion engine) than the first electric motor. This allows the length thereof in the longitudinal direction to be suppressed and, to that extent, allows the length of the whole hybrid driving unit in the longitudinal direction to be shortened and the mountability to the body to be improved.

According to the second aspect of the present invention, the second electric motor may be provided so as to have a large diameter and, hence, the length thereof in the longitudinal direction may be suppressed further by disposing the second electric motor as the foremost part among the first electric motor, the power-splitting planetary gear, the second electric motor and the transmission, all of which are disposed on one axis of the casing member.

According to the third aspect of the present invention, the second electric motor may be readily coupled with the transmission by providing the transmission adjacent to the second electric motor.

According to the fourth aspect of the present invention, the casing member and the supporting member for forming the hydraulic chamber of the hydraulic actuator may be made in common and the length of the whole hybrid driving unit in the longitudinal direction may be shortened by supporting both sides of the rotor of the second electric motor with the supporting members extending from the casing member, through the intermediary of the bearing members, and by forming the hydraulic chamber of the hydraulic actuator of the transmission with the supporting member between the second electric motor and the transmission among the supporting members.

According to the fifth aspect of the present invention, the length of the whole hybrid driving unit in the longitudinal direction may be shortened further because at least the part of the hydraulic chamber is provided on the inner diametric side of the stator, or specifically of the coil-end, of the second electric motor.

According to the sixth, seventh, and eighth aspects of the present invention, the second electric motor may be disposed on the side of the vehicle closer to the front than the first electric motor without complicating the disposition by disposing the second electric motor, the transmission, the power-splitting planetary gear and the first electric motor, in order, from the side closer to the internal combustion engine.

According to the ninth aspect of the present invention, a gap between the stator and the rotor of the first electric motor may be set smaller, and the output of the first electric motor may be improved, because the supporting members extending from the casing member steadily support both sides of the rotor of the first electric motor through the intermediary of the bearing members. Further, since the inner peripheral surface of the rotor of the first electric motor supports the output shaft through the intermediary of the bearings provided on the outer peripheral surface thereof, the rigidity for supporting the output shaft improves, and the diameter of the output shaft need not be increased unnecessarily. Accordingly, the diameter of the hybrid driving unit may be reduced as a whole.

According to the tenth aspect of the present invention, since the supporting members extending from the casing member support both sides of the rotor of the second electric motor through the intermediary of the bearing members, the gap between the stator and the rotor may be set small and the output of the second electric motor may be improved. This also allows the length of the second electric motor in the longitudinal direction to be shortened. Further, since the bearing members provided on the outer peripheral surface of the input shaft allow the input shaft to be supported by the inner peripheral surface of the rotor of the second electric motor, the diameter of the input shaft needs not be increased unnecessarily. Accordingly, the diameter of the hybrid driving unit may be reduced as a whole.

According to the eleventh, twelfth, and thirteenth aspects of the present invention, the second electric motor may be disposed on the side of a vehicle closer to the front than the first electric motor without complexity by disposing the second electric motor, the transmission, the power-splitting planetary gear and the first electric motor, in order, from the side closer to the internal combustion engine.

According to the fourteenth aspect of the present invention, since the supporting members extending from the casing member support both sides of the rotor of the first electric motor steadily, it is possible to set the gap between the stator and the rotor to be small and to improve the output of the first electric motor. Moreover, since the output element of the transmission is supported by the inner peripheral surface of the rotor of the first electric motor, through the intermediary of the bearings provided on the outer peripheral surface of the output element, the supporting rigidity of the output shaft is improved and, hence, no output shaft having a large diameter is required. Accordingly, it allows the diameter of the hybrid driving unit to be reduced as a whole.

According to the fifteenth aspect of the present invention, since the supporting members extending from the casing member support both sides of the rotor of the second electric motor steadily through the intermediary of the bearing members, this allows the gap between the stator and the rotor to be set small and the output of the second electric motor to be improved. Thereby, it allows the length of the second electric motor in the longitudinal direction to be shortened further. Additionally, this aspect of the present invention requires no input shaft having a large diameter, even if the input shaft is extended to the power-splitting planetary gear provided at the rear end, since the bearing members provided on the outer peripheral surface thereof support the input shaft by the inner peripheral surface of the rotor of the second electric motor and the inner peripheral surface of the output element of the transmission. Accordingly, the diameter of the hybrid driving unit may be reduced as a whole.

According to the sixteenth aspect of the present invention, since the casing member and the supporting members for forming the hydraulic chamber of the hydraulic actuator may be made in common by forming the hydraulic chamber of the hydraulic actuator of the transmission with the supporting member between the first electric motor and the transmission, among the supporting members, the length of the hybrid driving unit in the longitudinal direction may be shortened as a whole.

According to the seventeenth aspect of the present invention, since the transmission comprises the planetary gear, and may be provided on one axis, the diameter of the hybrid driving unit may be reduced.

According to the eighteenth aspect of the present invention, since the transmission has at least four shifting elements, the first shifting element is coupled with the rotor of the second electric motor, the second shifting element is coupled with the output shaft, and the transmission has braking elements, which are capable of fixing the third and fourth shifting elements to the case, respectively, it is possible to reduce the rotational speed of the rotor of the second electric motor at least at two stages just by providing the brakes. In general, when a clutch is used to shift the speeds, a hydraulic servo of the clutch is provided on the center axis to supply oil to the hydraulic servo of the clutch, and a plurality of seal rings are used to prevent leakage of oil among rotational members. In contrast, the brake consistent with the present invention requires no seal ring, like the conventional clutch requires, and the hydraulic servo need not be provided on the center axis because the hydraulic servo of the brake consistent with the present invention may be provided in the case. Accordingly, because the axial length of the hybrid driving unit may be reduced by composing the two stages of shift just by the brakes, the rigidity of the case is improved, and the efficiency thereof may be improved by reducing the seal rings.

According to the nineteenth aspect of the present invention, the planetary gear of the transmission comprises the Ravigneaux type planetary gear. Because the Ravigneaux type planetary gear allows the carriers of two planetary gears to be used in common, the axial length of the transmission may be shortened. Moreover, although the size of the carrier increases by using the carriers of the two planetary gears in common, it is possible to suppress vibration caused by whirling of the transmission because the carrier may be steadily supported by linking the carrier to the output shaft.

The twentieth aspect of the present invention relates to the FR-type vehicle carrying a hybrid driving unit consistent with the present invention whose mountability is improved.

BRIEF DESCRIPTION OF THE DRAWINGS

The aspects of the present invention will become more apparent by describing in detail illustrative, non-limiting embodiments thereof with reference to the accompanying drawings, in which.

Figure 1:
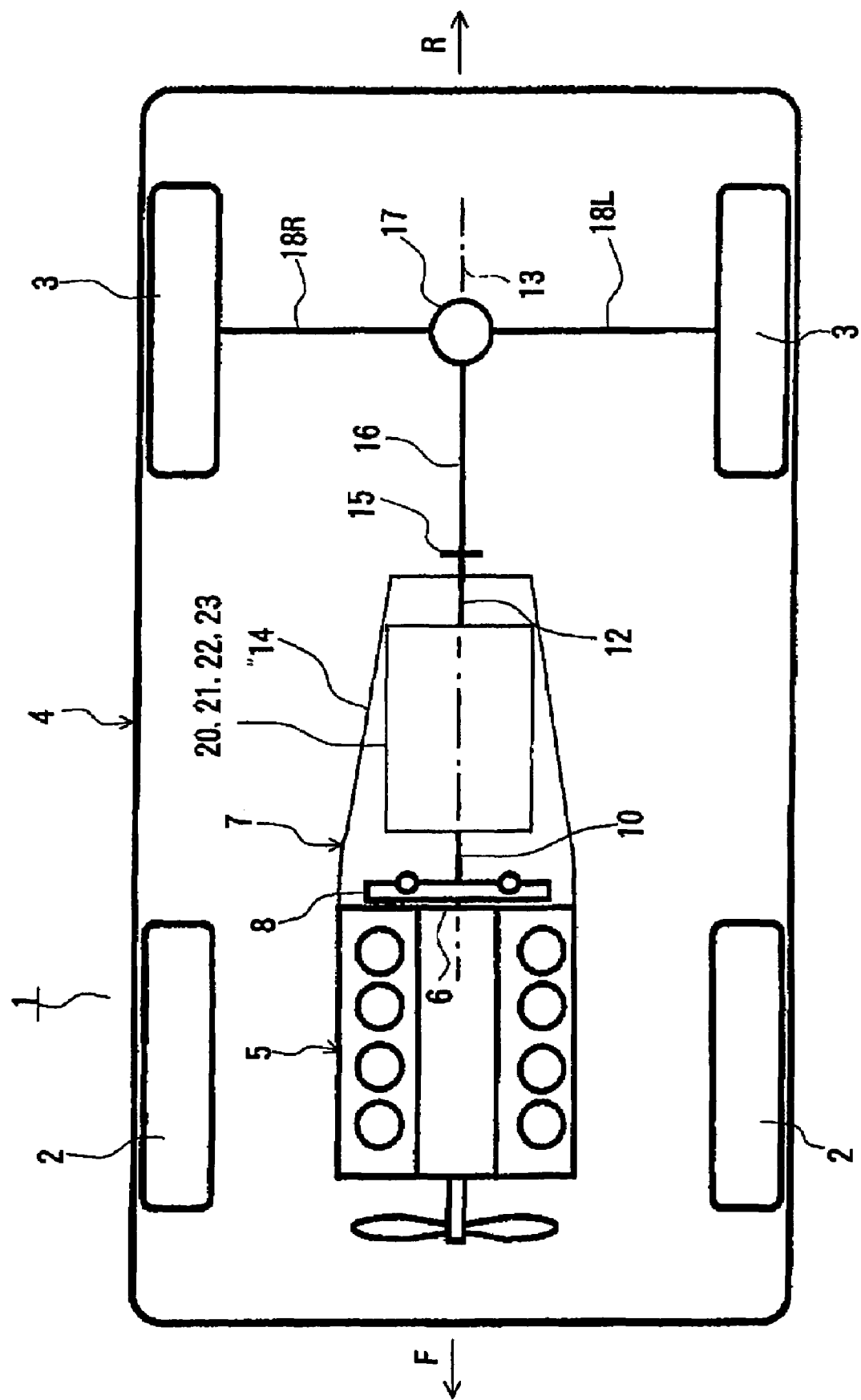
FIG. 1 depicts a plan view diagrammatically showing a vehicle carrying a hybrid driving unit consistent with the present invention.

DETAILED DESCRIPTION OF ILLUSTRATIVE NON-LIMITING EMBODIMENTS OF THE INVENTION illustrative and non-limiting embodiments of the present invention will be explained below with reference to the accompanying drawings. It is noted that the same reference numerals cited throughout several views denote the same components or effects and an overlapped explanation thereof will be omitted.

FIG. 1 shows an exemplary vehicle 1 carrying a hybrid driving unit consistent with the present invention. The vehicle 1 shown in FIG. 1 is a front-engine and rear-drive (hereinafter "FR") type vehicle, and FIG. 1 is a plan view diagrammatically showing the structure thereof. It is noted that in an actual vehicle, the direction indicated by an arrow F in FIG. 1 denotes the front side of the vehicle and the direction indicated by an arrow R denotes the rear side of the vehicle.

The vehicle 1 in FIG. 1 has a body 4 supported by right and left front wheels 2 and by right and left rear wheels 3, i.e., driving wheels. An internal combustion engine 5 is mounted to the front part of the body 4 through an intermediary of a rubber mount (not shown) in a manner of adjusting a crankshaft 6, i.e., its output shaft, in the longitudinal direction of the body. It is noted that in FIG. 1, the output shaft comprising a rear projection of the crankshaft is shown as the crankshaft 6. A hybrid driving unit 7 is connected behind the internal combustion engine 5.

The hybrid driving unit 7 has an input shaft 10 connected to the crankshaft 6 of the internal combustion engine 5 via a damper unit 8, a first electric motor 20, a power-splitting planetary gear 21, a transmission 22, a second electric motor 23 (see FIG. 2) and an output shaft 12 for outputting driving force. Here, the input shaft 10 and the output shaft 12 are disposed on one axis 13 such that the input shaft 10 is disposed on the front side and the output shaft 12, is disposed on the rear side. These input shaft 10 and the output shaft 12 are disposed along the longitudinal direction of the body 4 and are stored in a casing member 14 which is lengthy in the longitudinal direction together with the first electric motor 20, the power-splitting planetary gear 21, the transmission 22 and the second electric motor 23 (described above). It is noted that the hybrid driving unit 7 will be described in detail below.

The output shaft 12 of the hybrid driving unit 7 projects from the rear end of the casing member 14 (described above) and extends further toward the rear to be coupled with a differential unit 17 via a flexible coupling 15 and a propeller shaft 16 having a universal joint, a center bearing and others (not shown). The differential unit 17 is coupled with the right and left rear wheels 3 (described above) via a left driving shaft 18L and a right driving shaft 18R.

In the vehicle 1 constructed as described above, motive power generated by the internal combustion engine 5 is inputted to the input shaft 10 of the hybrid driving unit 7 and is outputted from the output shaft 12 after being regulated by the first electric motor 20, the power-splitting planetary gear 21, the transmission 22 and the second electric motor 23 (which is described below). Then, the motive power thus controlled is transmitted to the right and left rear wheels 3, i.e., the driving wheels, via the propeller shaft 16 and others.

Next, a hybrid driving unit 7A embodiment will be explained as one illustrative and non-limiting example of a hybrid driving unit 7 consistent with the present invention, which is mounted to the vehicle 1, as shown in FIG. 1. The outline of the whole hybrid driving unit 7A will be explained first with reference to the skeleton view in FIG. 2, and then its structure will be detailed with reference to FIG. 3. It is noted that in these figures, the direction indicated by an arrow F denotes the front side of the body (i.e., the internal combustion engine side) and the direction indicated by an arrow R denotes the rear side of the body (i.e., the differential unit side).

Figure 2:
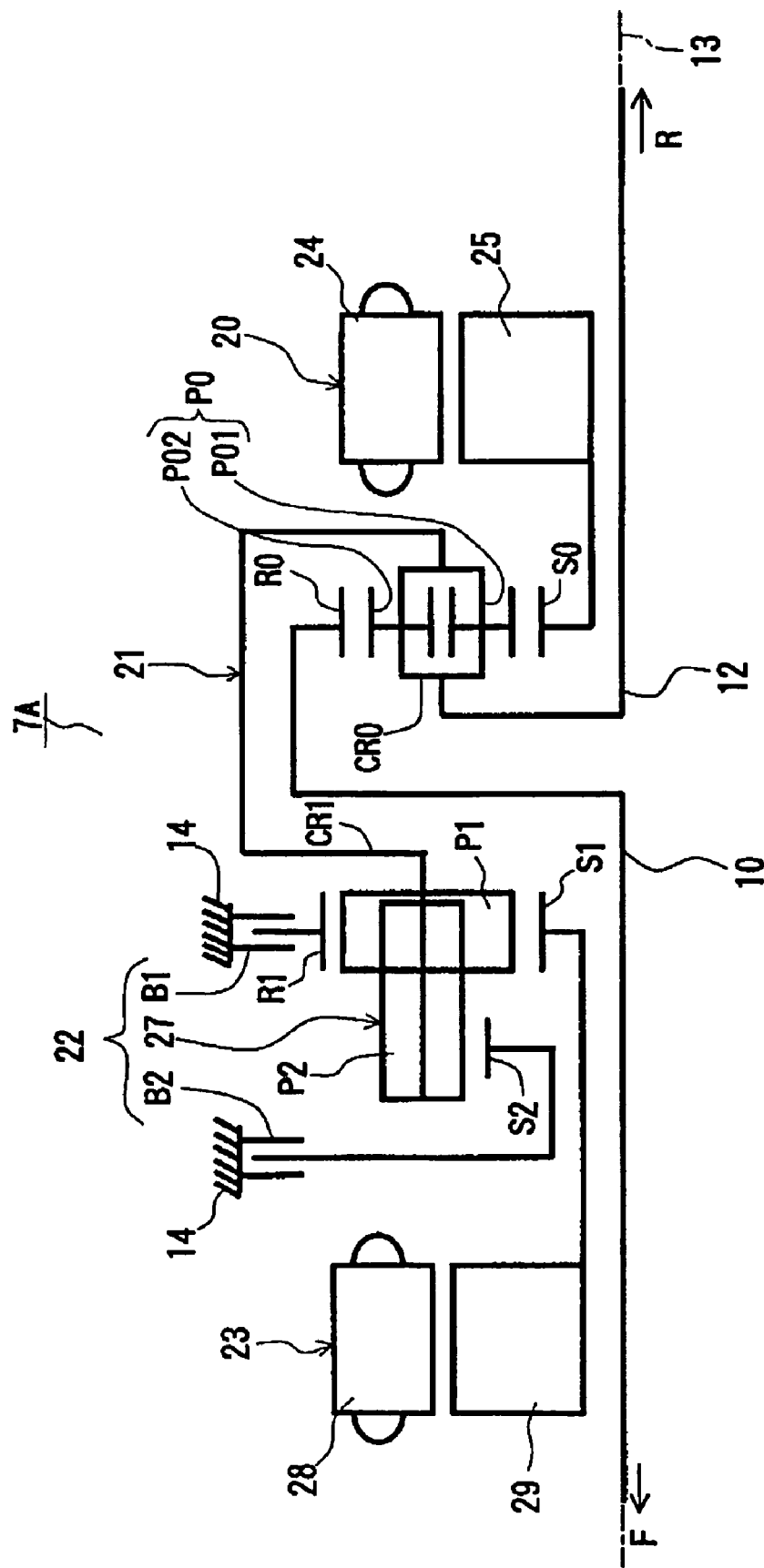
FIG. 2 depicts a skeleton view showing a hybrid driving unit of a first illustrative and non-limiting embodiment of the present invention.

According to the illustrative and non-limiting embodiment shown in FIG. 2, the hybrid driving unit 7A comprises the second electric motor 23, the transmission 22, the power-splitting planetary gear 21 and the first electric motor 20, arranged in order, from the side closer to the internal combustion engine 5 in FIG. 1 to the side closer to the differential unit 17 in FIG. 1, i.e., arranged in order from the front side to the rear side. All of the aforementioned are stored within the casing member 14 (see FIG. 1) and are disposed in line, on and along, or around an axis 13, in order, from the front side. The aforementioned devices will be explained below, in order, beginning with the second electric motor 23, and continuing with the transmission 22, the power-splitting planetary gear 21 and, finally, the first electric motor 20.

The second electric motor 23 has a stator 28 fixed to the casing member 14 (see FIG. 1) and a rotor 29, which is rotatably supported on the inner diametric side of the stator 28 (hereinafter, with respect to the position in the radial direction of the casing member 14, the side closer to the center (the axis 13) will be referred to as the "inner diametric side" and the side further from the center will be referred to as the "outer diametric side". The rotor 29 of the second electric motor 23 is coupled with a sun gear S1 of the transmission 22 (described in detail below). Similar to the first electric motor 20 (described in detail below), the second electric motor 23 is connected to a hybrid driving battery (hereinafter "HV battery") (not shown) via an inverter (not shown). However, the main functions of the first electric motor 20 and the second electric motor 23 differ from each other. For example, in contrast with the first electric motor 20, which functions mainly for the purpose of power generation, the second electric motor 23 functions mainly as a driving motor for supplementing the motive power (driving force) of the vehicle 1. However, the second electric motor 23 also functions as a generator, for example, by regenerating vehicular inertia force as electrical energy in braking the vehicle.

The transmission 22 comprises a so-called Ravigneaux type planetary gear unit 27 comprising one double pinion planetary gear train and a single planetary gear train that uses one of their pinions in common. The transmission 22 also comprises first and second brakes B1 and B2.

The planetary gear unit 27 comprises two sun gears S1 and S2, a carrier CR1 supporting a pinion P1 and a pinion (common long pinion) P2 and a ring gear R1. Between the two pinions P1 and P2, the pinion P1 engages with the sun gear S1 and the ring gear R1, and the pinion P2, i.e., the common long pinion, engages with the sun gear S2 and the pinion P1. The ring gear R1 of the planetary gear unit 27 is coupled with the first brake B1 and the sun gear S2 is coupled with the second brake B2. As a whole, the sun gear S1, which is an input member, is coupled with the rotor 29 of the second electric motor 23 (described above), and the carrier CR1, which is an output member, is coupled with the output shaft 12 via a carrier CR0 of the power-splitting planetary gear 21 (described in detail below). The transmission 22 is arranged so as to be able to change two deceleration stages where reduction ratios are different by engaging one of the first and second brakes B1 and B2 while releasing the other and by releasing the one while engaging the other. That is, the transmission 22 is arranged so as to change the degree of the motive power inputted from the second electric motor 23 (described above) via the sun gear S1 and to transmit it to the output shaft 12 via the carrier CR1.

The power-splitting planetary gear 21 comprises a double pinion planetary gear train disposed coaxially with the output shaft 12. The power-splitting planetary gear 21 comprises a carrier (third rotary element) CR0 supporting a plurality of pinions P0 (P01 and P02), a sun gear (second rotary element) S0 engaging with the pinion P01, and a ring gear (first rotary element) R0 engaging with the pinion P02. The ring gear R0 of the power-splitting planetary gear 21 is coupled with the input shaft 10, the sun gear S0 is coupled with the rotor 25 of the first electric motor 20 and the carrier CR0 is coupled with the output shaft 12. The power-splitting planetary gear 21 splits the motive power inputted to the ring gear R0 via the input shaft 10 to the first electric motor 20 via the sun gear S0 and to the output shaft 12 via the carrier CR0 based on the control of the revolution of the first electric motor 20. It is noted that the power split to the first electric motor 20 is used mainly for generating electricity and the power split to the output shaft 12 is used mainly for driving the vehicle 1.

The first electric motor 20 has a stator 24 fixed to the casing member 14 (see FIG. 1) and a rotor 25 rotatably supported on the inner diametric side of the stator 24. The rotor 25 of the first electric motor 20 is coupled with the sun gear S0 of the power-splitting planetary gear 21. The first electric motor 20, generates electricity based on the motive power inputted via the sun gear S0 and charges the HV battery via the inverter.

Among the second electric motor 23, the transmission 22, the power-splitting planetary gear 21 and the first electric motor 20, in the exemplary hybrid driving unit 7A shown in FIG. 2, the two front devices are disposed on the input shaft 10 and the remaining two devices are disposed on the output shaft 12. The aforementioned devices are linked to each other as follows. The input shaft 10 extends toward the rear side through the inner peripheral side of the second electric motor 23 and the transmission 22, and is linked to the ring gear R0 of the power-splitting planetary gear 21 by passing through the rear side of the transmission 22 and the front side of the power-splitting planetary gear 21. The rotor 29 of the second electric motor 23 extends toward the rear side through the outer peripheral side of the input shaft 10 and the inner peripheral side of the sun gear S2 of the transmission 22, and is linked to the sun gear S1 of the transmission 22. The carrier CR1 of the transmission 22 extends toward the outer diametric side and is linked to the carrier CR0 of the power-splitting planetary gear 21 from the rear side thereof (the first electric motor 20 side) by passing through the outer peripheral side of the ring gear R0 of the power-splitting planetary gear 21. The rotor 25 of the first electric motor 20 extends toward the front side through the outer peripheral side of the output shaft 12 and is linked to the sun gear S0 of the power-splitting planetary gear 21. Then, in the power-splitting planetary gear 21, in which the ring gear R0 is linked to the input shaft 10, the carrier CR0 is linked to the carrier CR1 of the transmission 22, the sun gear S0 is linked to the rotor 25 of the first electric motor 20 as described above, and the front side (the transmission 22 side) of the carrier CR0 is linked to the front end of the output shaft 12. The output shaft 12 extends toward the rear side through the inner peripheral side of the power-splitting planetary gear 21 and the first electric motor 20.

As for the longitudinal disposition of the second electric motor 23, the transmission 22, the power-splitting planetary gear 21 and the first electric motor 20 (described above), i.e., the disposition along the axis 13, consistent with the present invention, at least the second electric motor 23 is disposed on the side closer to the front side than the first electric motor 20. Furthermore, in this illustrative and non-limiting embodiment, the second electric motor 23 is disposed on the foremost side (the side closer to the internal combustion engine 5). This allows the hybrid driving unit 7A to have a preferable mountability to the body 4 (as described in detail below).

The operation and effect of the hybrid driving unit 7A, explained with reference to the skeleton view thereof in FIG. 2, will be explained after detailing the structure of the hybrid driving unit 7A with reference to FIG. 3.

Figure 3:
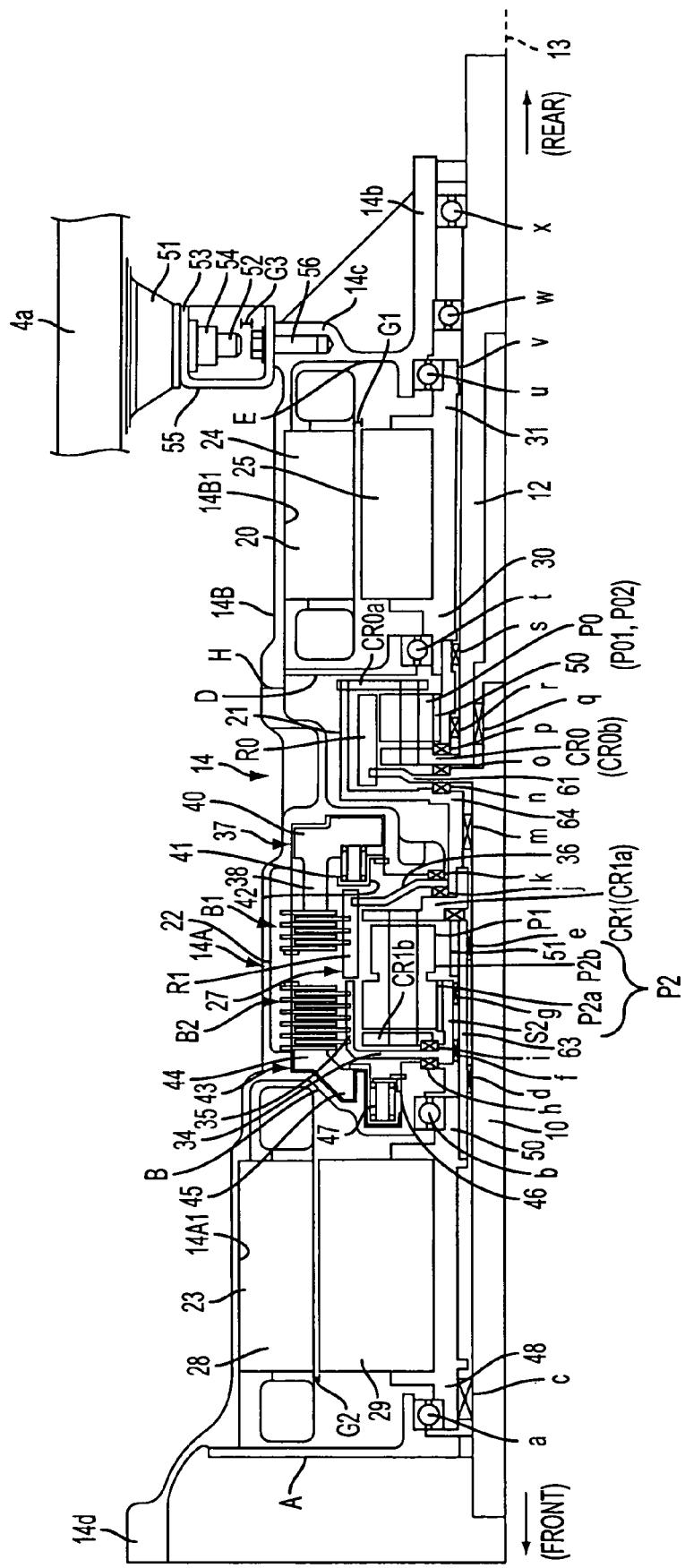
FIG. 3 depicts a longitudinal section view showing the structure of the hybrid driving unit of the first illustrative and non-limiting embodiment of the present invention.

FIG. 3 shows an upper half portion of the longitudinal section view of the exemplary hybrid driving unit 7A including the axis 13.

The illustrative hybrid driving unit 7A, as shown in FIG. 3, comprises the input shaft 10 and the output shaft 12 disposed on the axis 13. Further, the illustrative hybrid driving unit 7A, as shown in FIG. 3, comprises the second electric motor 23, the transmission 22, the power-splitting planetary gear 21 and the first electric motor 20 disposed in line, around and along, the axis 13. All of the aforementioned devices are stored within the casing member 14, except for the output shaft 12, which is on the rear end and extends out of the casing member 14 toward the rear side.

Taking the readiness of assembly and other considerations into account, the casing member 14 is divided into a plurality of parts in the longitudinal direction along the axis 13 and is formed in a body by combining junctions of the respective parts. In the illustrative and non-limiting embodiment shown in FIG. 3, a front partial case 14A is connected with a rear partial case 14B at the junction H to form the casing member 14. It is noted that in the present illustrative and non-limiting embodiment, the junction H is located near the rear end of the power-splitting planetary gear 21, i.e., just before a partition D (which will be explained below). In the casing member 14, a plurality of partitions (supporting members), i.e., partitions A, B, C, D and E, are formed at different positions in the longitudinal direction in order from the front side. Among these partitions A through E, the partitions A and E are disposed near the front and rear ends of the casing member 14, respectively, and the space within the case between the partitions A and E is divided into four spaces by the partitions B, C and D longitudinally along the axis 13. These partitions A through E act as reinforcing members of the casing member 14 and are used for retaining bearings a through x (described below) and for forming hydraulic chambers 40 and 45 (described below). Among the partitions A through E, the partitions A and D are constructed by mounting, e.g., by bolting disc-like partitioning members, i.e., a separate member, at the positions indicated in FIG. 3. In one illustrative and non-limiting embodiment of the present invention, the radial dimension of a motor storage section 14A1 between the partitions A and B in the partial case 14A is set to be larger than the radial dimension of a motor storage section 14B1 in the partial case 14B. This results in improving the mountability in mounting the hybrid driving unit 7A to the FR type vehicle 1.

In the illustrative and non-limiting embodiment of the present invention as shown in FIG. 3, the second electric motor 23, the transmission 22, the power-splitting planetary gear 21 and the first electric motor 20 are stored within the four spaces divided by the partitions A through E, respectively. That is, the second electric motor 23 is stored in the space between the partitions A and B, the transmission 22 is stored between the partitions B and C, the power-splitting planetary gear 21 is stored between the partitions C and D, and the first electric motor 20 is stored between the D and E, respectively. Beginning with the second electric motor 23, these devices will be explained in detail below.

In the illustrative embodiment shown in FIG. 3, the second electric motor 23 comprises an AC permanent magnet synchronous motor (brushless DC motor) and is disposed on the outer diametric side of the input shaft 10 coaxially therewith. The second electric motor 23 comprises the stator 28, which is fixed to the inner peripheral face of the casing member 14, and the rotor 29, which is rotatably disposed on the inner diametric side of the stator 28, apart from the stator 28 by a predetermined air gap G2. The inner diametric side of the rotor 29 is formed in a cylindrical shape and stages 48 and 50 are formed, respectively, at the front and rear outer peripheral faces of the cylindrical part. The casing member 14 rotatably supports the rotor 29 through an intermediary of bearings a and b fitted between the stages 48 and 50 and the partitions A and B while being positioned in the longitudinal direction. The rear end of the cylindrical part of rotor 29 is coupled with the sun gear S1 of the transmission 22 (described in detail below) via a sleeve 63 fitted so as to cover the outer peripheral face of the input shaft 10. The input shaft 10 rotatably supports the rotor 29 and the sun gear S1 mutually formed in a body through an intermediary of bearings d and e fixed on the outer peripheral face of the input shaft 10. Since the rotor 29 of the second electric motor 23 is rotatably supported by the bearings a and b fixed to the partitions A and B as described above, the position of the rotor 29 in both the longitudinal and the radial directions may be maintained accurately. Accordingly, even if a force acts on the casing member 14 and bends the casing member 14 in the vertical or lateral direction, the predetermined air gap G2 between the stator 28 and the rotor 29 may be kept accurately. It is noted that the second electric motor 23 is connected to the HV battery via the inverter similarly to the first electric motor 20 (described below).

The input shaft 10 is rotatably supported by the casing member 14 through a bearing c provided at a position axially overlapping with the bearing a, a bearing q, which is provided between the outer peripheral face of the rear end of the input shaft 10 and the cylindrical inner peripheral face of the front end of the output shaft 12, bearings r and s, which are provided between the sun gear S0 of the power-splitting planetary gear 21 and the output shaft 12, and a bearing t, which is provided between the rotor 25 of the first electric motor 20 and the partition D.

According to the exemplary embodiment shown in FIG. 3, the transmission 22 is disposed between the partitions B and C of the casing member 14, i.e., at the intermediate position of the casing member 14 in the longitudinal direction (the direction along the axis 13). The transmission 22 has the Ravigneaux type planetary gear unit 27 disposed on the inner diametric side, and the first and second brakes B1 and B2 disposed, respectively, on the rear and front sides on the outer diametric side thereof.

The planetary gear unit 27 comprises a first sun gear S1 (hereinafter simply referred to as "the sun gear S1"), a second sun gear S2 (hereinafter simply referred to as "the sun gear S2"), which is disposed on the front side of the sun gear S1 and slightly on the outer diametric side, the ring gear R1, which is disposed on the outer diametric side of the sun gear S1, the pinion P1, which engages with the sun gear S1 and the ring gear R1, the pinion P2, which comprises the common long pinion and engages with the sun gear S2 and the pinion P1, and the carrier CR1, which supports pinions P1 and P2. Beginning with the sun gear S1, the aforementioned parts will be explained below.

The sun gear S1 is coupled with the rear end of the rotor 29 of the second electric motor 23 (described above) via the sleeve 63 (described above). This sun gear S1 is relative-rotatably supported by the input shaft 10, together with the sleeve 63, through the intermediary of the bearings d and e, which are fitted to the outer peripheral face of the input shaft 10.

According to the illustrative embodiment shown in FIG. 3, the sun gear S2 is formed in a body with a flange section 34 extending from the front end of the sun gear S2 to the outer diametric side along the front carrier plate CR1b of the carrier CR1 and with a drum section 35 extending from the outer diametric end of the flange section 34 toward the rear. The second brake B2 (described below) is interposed between the outer peripheral face of this drum section 35 and an inner peripheral spline 14a of the inner peripheral face of the casing member 14. The sun gear S2 is rotatably supported by bearings f and g, which are fitted to the outer peripheral face of the sleeve 63 formed in a body with the sun gear S1 (described above) and by bearings h and i, which are fitted, respectively, to the front and rear faces on the inner diametric side (basal end side) of the flange section 34. It is noted that the bearing h is interposed between the flange section 34 and the inner diametric rear face of the partition B, and the bearing i is interposed between the flange section 34 and the front face of the inner diametric side of the front side carrier plate CR1b of the carrier CR1 (described below) to restrict the movement of the sun gear S2 in the axial direction.

The ring gear R1 is provided with a flange section 36, fixed at the rear end thereof and extending toward the inner diametric side along the rear carrier plate CR1a of the carrier CR1, and is rotatably supported by bearings j and k, which are fitted to the front and rear faces on the inner diametric side of the flange section 36. The bearing j is interposed between the flange section 36 and the rear carrier plate CR1a of the carrier CR1, and the bearing k is interposed between the flange section 36 and the inner diametric front face of the partition C. The first brake B1 is interposed between the outer peripheral face of the ring gear R1 and the inner peripheral spline 14a of the inner peripheral face of the casing member 14 to restrict the movement of the ring gear R1 in the axial direction.

According to the exemplary embodiment shown in FIG. 3, the pinion P1 is rotatably supported by the carrier CR1 and is engaged with the sun gear S1 (described above) on the inner diametric side and is engaged with the ring gear R1 (described above) on the outer diametric side.

The pinion P2 is the common long pinion in which a large-diametric gear P2a formed on the front side and a small-diametric gear P2b formed on the rear side are combined in a body. In the pinion P2, the large-diametric gear P2a is engaged with the sun gear S2 (described above) and the small-diametric gear P2b is engaged with the pinion P1 (described above).

The carrier CR1 rotatably supports the pinions P1 and P2 with the front and rear carrier plates CR1b and CR1a. The rear carrier plate CR1a is coupled with the rear carrier plate CR0a of the carrier CR0 of the power-splitting planetary gear 21 (described below) via a coupling member 64. This coupling member 64 comprises a sleeve portion connected with the inner diametric rear end of the rear carrier plate CR1a of the carrier CR1 and extending toward the rear, a flange portion extending toward the outer diametric side from the rear end of the sleeve portion, and a drum portion extending toward the rear from the outer diametric edge of the flange portion. The coupling member 64 is relative-rotatably supported by a bearing m, which is fitted between the inner peripheral face of the sleeve portion and the outer peripheral face of the input shaft 10. The carrier CR1 is relative-rotatably supported by the above-mentioned bearing i, which is fitted to the inner diametric front face of the front carrier plate CR1b, and by the bearing j, which is fitted to the inner diametric rear face of the rear carrier plate CR1a. The axial movement of the carrier CR1 is rotatably restricted by the partitions B and C, by the bearing h fitted to the inner diametric front face (basal end side) of the flange section 34 extending from the sun gear S2, and by the bearing k fitted to the inner diametric rear face of the flange section 36 extending from the ring gear R1.

According to the illustrative and non-limiting embodiment shown in FIG. 3, the first brake B1 comprises a large number of discs and friction plates (brake plates) and is spline-coupled between an outer peripheral spline, which is formed on the outer peripheral face of the ring gear R1 (described above), and the inner spline 14a, which is formed on the inner peripheral face of the casing member 14. A hydraulic actuator 37 for the first brake is disposed on the rear side of the first brake B1. The hydraulic actuator 37 comprises a piston 38, which is disposed behind the first brake B1 so as to be movable in the longitudinal direction, a first hydraulic chamber 40, which is provided at the outer diametric front face of the partition C and into which the rear end of the piston 38 is oil-tightly fitted, and a return spring (compression spring) 42 interposed between a retainer 41, which is fixed to the partition C, and the inner diametric front face of the piston 38 to bias the piston 38 to the rear.

The second brake B2 is disposed just before the first brake B1 (described above). The second brake B2 comprises a large number of discs and friction plates (brake plates) and is spline-coupled between an outer peripheral spline, which is formed on the outer peripheral face of the drum section 35 combined with the sun gear S2 (described above), and the inner spline 14a, which is formed on the inner peripheral face of the casing member 14. A hydraulic actuator 43 for the second brake is disposed on the front side of the second brake B2. The hydraulic actuator 43 comprises a piston 44, which is disposed before the second brake B2 so as to be movable in the longitudinal direction, a second hydraulic chamber 45, which is provided at the outer diametric rear face of the partition B and into which the front end of the piston 44 is oil-tightly fitted, and a return spring (compression spring) 47 interposed between a retainer 46, which is fixed to the partition B, and the inner diametric rear face of the piston 44 to bias the piston 44 to the front.

According to the exemplary embodiment shown in FIG. 3, in the transmission 22 constructed as described above, an output from the second electric motor 23 is transmitted to the sun gear S1 via the sleeve 63. In a low state, the first brake B1 is engaged and the second brake B2 is released. Accordingly, the ring gear R1 is locked and the sun gear S2 is freely rotatable in this state. The revolution of the sun gear S1 (described above) is extensively reduced via the pinion P1 and is transmitted to the carrier CR1. The revolution of the carrier CR1 is then transmitted to the output shaft 12.

When the transmission 22 is in a high state, the first brake B1 is released and the second brake B2 is engaged. Accordingly, the sun gear S2 is locked and the ring gear R1 is freely rotatable in this state. In this state, the revolution of the sun gear S1 is transmitted to the pinion P1 and the pinion P2 engages with the locked sun gear S2. Then, the carrier CR1 moves around the sun gear at a restricted predetermined number of revolutions and the revolution of the carrier CR1 reduced in a relatively small extent is transmitted to the output shaft 12 at this time.

Thus, the transmission 22 transmits the extensively reduced revolution to the output shaft 12 in the low state by engaging the first brake B1 and by releasing the second brake B2, respectively. In contrast, it transmits the revolution reduced in a relatively small extent to the output shaft 12 by releasing the first brake B1 and by engaging the second brake B2, respectively. Because the transmission 22 is thus capable of shifting in the two stages, the second electric motor 23 may be downsized. That is, the transmission 22 enables the use of a small electric motor, to transmit sufficient driving torque to the output shaft 12 in the low state in starting the vehicle 1 when high torque is required, and to prevent the rotor 29 from rotating at high-speed by putting it in the high state when the output shaft 12 is rotating at high-speed.

Consistent with the illustrative embodiment shown in FIG. 3, the power-splitting planetary gear 21 is disposed between the partitions C and D of the casing member 14. The power-splitting planetary gear 21 comprises the double pinion planetary gear train disposed coaxially with the output shaft 12 as described above and comprises the ring gear (first rotary element) R0, the sun gear (second rotary element) S0 and the carrier (third rotary element) CR0 supporting the pinions P01 and P02 (note that these are shown together as a pinion P0 in FIG. 3). Among them, the ring gear R0 extends toward the front and is fixed to the outer diametric end of the flange section 61, which extends from the outer peripheral face near the rear end of the input shaft 10 to the outer diametric side along the carrier CR0. The front carrier plate CR0b of the carrier CR0 is coupled with the front end of the output shaft 12. The sun gear S0 extends toward the rear and is coupled with the rotor 25 of the first electric motor 20.

As shown in FIG. 3, bearings n through s are fitted to positions for the power-splitting planetary gear 21 that will be described in detail below. The bearing n is fitted between the inner diametric rear face of the flange portion of the coupling member 64 and the inner diametric front face of the flange 61, whereas the bearing o is fitted between the inner diametric rear face of the flange section 61 and the inner diametric front face of the front carrier plate CR0b, and the bearing p is fitted between the inner diametric front face of the front carrier plate CR0b and the front end face of the sun gear S0, respectively. The bearing q is fitted between the outer peripheral face at the rear end of the input shaft 10 and the inner peripheral face of the cylindrical part at the front end of the output shaft 12, and the bearings r and s are fitted between the outer peripheral face of said cylindrical part and the inner peripheral face of the sun gear S0, respectively. These bearings n through s support the ring gear R0, such that the ring gear R0 is rotatable with respect to the casing member 14 in a body, with respect to the input shaft 10, and with respect to the carrier CR0 and the sun gear S0, and such that the ring gear R0 is relative-rotatable with respect to the output shaft 12. Thus, in the power-splitting planetary gear 21, the ring gear R0, which is the input section, is fixed to the input shaft 10. Further, the sun gear S0 and the carrier CR0, which are the output sections (to which power is split), are coupled with the front end of the rotor 25 of the first electric motor 20 and to the front end of the output shaft 12, respectively. That is, the power-splitting planetary gear 21 is arranged so as to split the power of the internal combustion engine 5 inputted to the ring gear R0 via the input shaft 10 (see FIG. 1) to the side of the first electric motor 20 via the sun gear S0 and to the side of the output shaft 12 via the carrier CR0. The ratio of split of power is decided based on the state of the revolution of the first electric motor 20 (described in detail below). That is, when the rotor 25 of the first electric motor 20 is caused to generate a large amount of power, an amount of power generated by the first electric motor 20 increases and the power outputted to the output shaft 12 is reduced to that extent. In contrast, when the rotor 25 of the first electric motor 20 is caused to generate a small amount of power, an amount of power generated by the first electric motor 20 decreases and the power outputted to the output shaft 12 increases to that extent.

According to the illustrative and non-limiting embodiment of the present invention as shown in FIG. 3, the first electric motor 20 comprises, for example, an AC permanent magnet synchronous motor (brushless DC motor). The first electric motor 20 is stored between the partitions D and E and is disposed on the outer diametric side of the output shaft 12 coaxially therewith. The first electric motor 20 comprises the stator 24, which is fixed to the inner peripheral face of the casing member 14, and the rotor 25, which is rotatably disposed on the inner diametric side of the stator 24, apart from the stator 24 by the predetermined air gap G1. The rotor 25 is formed into a cylindrical shape and stages 30 and 31 are formed at the front and rear outer peripheral faces of the cylindrical part. The casing member 14 rotatably supports the rotor 25 through an intermediary of bearings t and u, which are fitted while being positioned in the longitudinal direction between stages 30 and 31 and the partitions D and E. The sun gear S0 of the power-splitting planetary gear 21 (described above) is fixed to the front end of the cylindrical part. The rotor 25 and the sun gear S0 formed mutually in a body are relative-rotatably supported by the output shaft 12, through the intermediary of bearings r, s and v, which are fixed on the outer peripheral face on the front end side of the output shaft 12. It is noted that., as for the longitudinal disposition, the bearings s and v are disposed at positions corresponding to the bearings t and u, respectively. Because the rotor 25 of the first electric motor 20 is rotatably supported by the bearings t and u, which are fixed to the partitions D and E as described above, the longitudinal and radial directions of the rotor 25 may be assured accurately. Accordingly, even if a force acts on the casing member 14 and bends the casing member 14 in the vertical or horizontal direction, the predetermined air gap G1 between the stator 24 and the rotor 25 may be kept accurately. It is noted that the first electric motor 20 is connected to the HV battery via the inverter as described above. The main function of the first electric motor 20 constructed as described above is to generate electric power based on the power split to the sun gear S0 of the power-splitting planetary gear 21, to drive the second electric motor 23 via the inverter, and to charge the HV battery.

Consistent with the illustrative embodiment of the present invention shown in FIG. 3, the input shaft 10 is rotatably supported by the casing member 14, through the intermediary comprising the bearing c, which is provided at a position coaxially overlapping with the bearing a, the bearing q, which is provided between the outer peripheral face at the rear end of the input shaft 10 and the inner peripheral face of the cylindrical part at the front end of the output shaft 12, the bearings r and s, which are provided between the sun gear S0 of the power-splitting planetary gear 21 and the output shaft 12, and the bearing t, which is provided between the rotor 25 of the first electric motor 20 and the partition D.

The casing member 14 storing the second electric motor 23, the transmission 22, the power-splitting planetary gear 21 and the first electric motor 20 as described above has a boss section 14b which extends toward the rear on the inner diametric side of the partition E at the rear end thereof. The casing member 14 rotatably supports the output shaft 12 by the boss section 14b through an intermediary of bearings w and x.

The outer diametric side of the partition E of the casing member 14 is thickened to compose a mounting section 14c. A coupling section 14d at the front end of the casing member 14 is connected with the internal combustion engine 5, which is rubber-mounted to the body 4 (see FIG. 1), and the rear end thereof is rubber-mounted to a part 4a of the body by utilizing the mounting section 14c. That is, the part 4a of the body is provided with a rubber pedestal 51 to which a stay 55 is fixed by a bolt 52, a washer 53 and a nut 54. Then, the casing member 14 is mounted to the stay 55 (described above) by a bolt 56 screwed to the mounting section 14c near the rear end of the casing member 14. It is noted that because the casing member 14 is arranged so that a gap G3, between the bolt 52 on the part 4a side and the bolt 56 on the casing member 14 side, is shorter than a screwing length of the bolt 56, the bolt 56 will not come out of the mounting section 14c and, thus, the rear end of the casing member 14 will not be put out of the body part 4a, even if the bolt 56 happens to be loosened.

In the illustrative and non-limiting embodiment of the hybrid driving unit 7A constructed as described above, the motive power inputted to the input shaft 10 is inputted to the ring gear R0 of the power-splitting planetary gear 21 to be distributed (divided) to the sun gear S0 and the carrier CR0, as shown in the skeleton view in FIG. 2. Moreover, the power distributed to the sun gear S0 is inputted to the rotor 25 of the first electric motor 20 to generate electric power. The electric power thus generated is used via an inverter to drive the second electric motor 23 or is used to charge the HV battery. The second electric motor 23, to which the electric power is supplied from the HV battery via the inverter, drives the output shaft 12 via the transmission 22 and the carrier CR0. That is, the power from the internal combustion engine 5 and the power from the second electric motor 23 are combined and outputted to the output shaft 12. It is noted that because the transmission 22 is arranged so as to be able to switch between the high and low states as described above, the power corresponding to the high or low state is outputted to the output shaft 12.

In the illustrative and non-limiting embodiment shown in FIG. 3, the second electric motor 23 is disposed on the side closer to the front (the side closer to the internal combustion engine 5). The casing member 14 is also formed such that the inner diameter of the part in which the stator 28 of the second electric motor 23 is fixed is larger than that of the part in which the stator 24 of the first electric motor 20 is fixed. This allows the second electric motor 23, which, for example, must generate a large torque in accelerating the vehicle 1 at the time of starting, to be constructed so as to have a large radial dimension (as compared to that of the first electric motor 20), and allows the length thereof in the longitudinal direction to be suppressed to that extent, so that the length of the whole hybrid driving unit 7A may be shortened and its mountability to the body 4 may be improved.

Next, a hybrid driving unit 7B of another illustrative and non-limiting embodiment of the present invention will be explained as another example of an inventive hybrid driving unit 7, which is mounted to the vehicle, as shown in FIG. 1. The outline of the whole hybrid driving unit 7B will be explained first with reference to the skeleton view in FIG. 4, and then its structure will be detailed with reference to FIG. 5. It is noted that in these figures, the direction indicated by an arrow F denotes the front side of a body of the vehicle 1 (i.e., the internal combustion engine side) and the direction indicated by an arrow R denotes the rear side thereof (i.e., the differential unit side).

Figure 4:
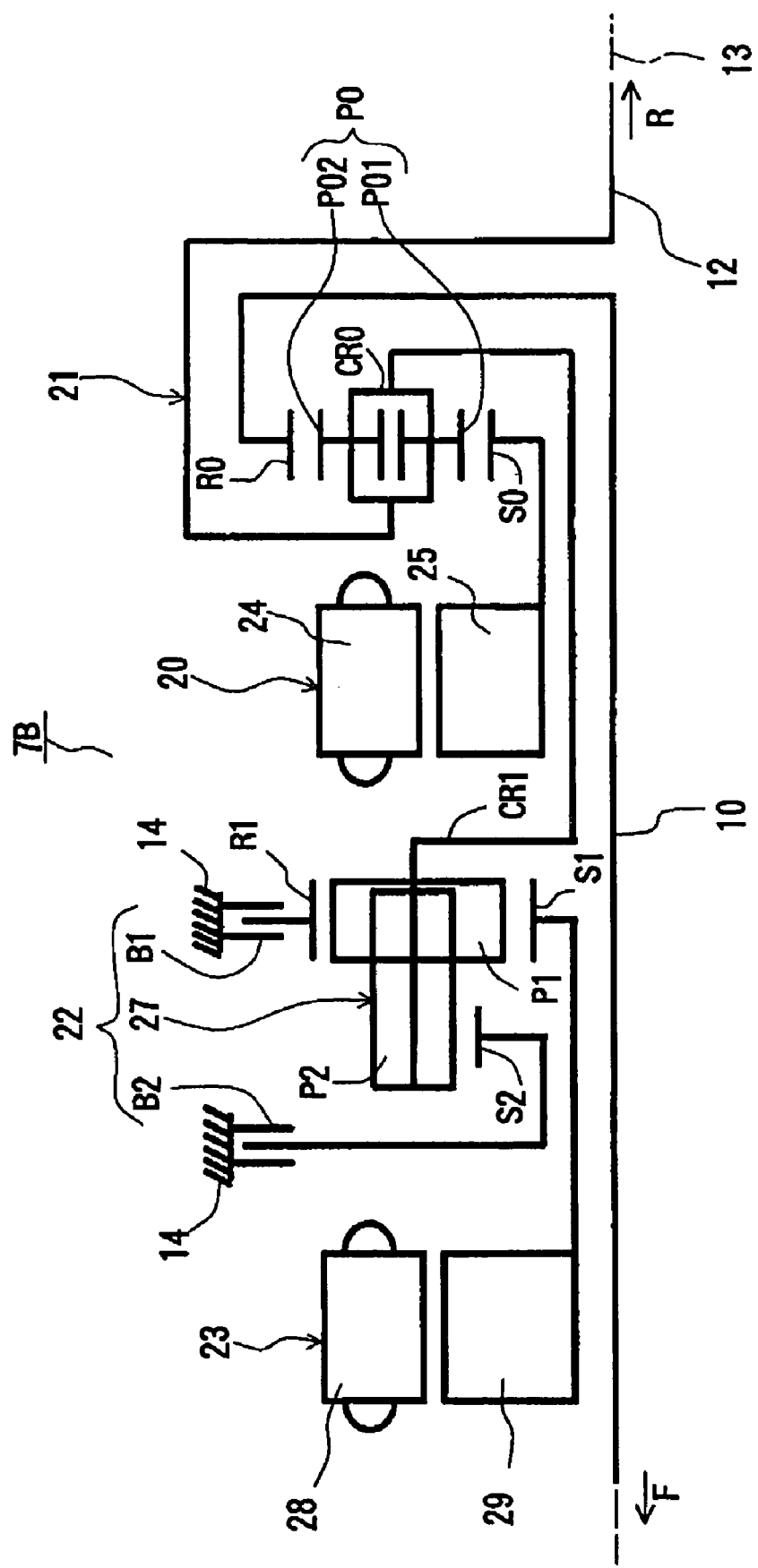
FIG. 4 depicts a skeleton view showing a hybrid driving unit of a second illustrative and non-limiting embodiment of the present invention.

According to the exemplary embodiment shown in FIG. 4, the hybrid driving unit 7B comprises a second electric motor 23, a transmission 22, a first electric motor 20 and a power-splitting planetary gear 21, arranged in order, from the side closer to an internal combustion engine 5 in FIG. 1, i.e., in order from the front side to the rear side. All of the aforementioned are stored within a casing member 14 (see FIG. 1) and are disposed in line, on and along, or around an axis 13, in order, from the front side. The aforementioned devices will be explained below, beginning with the second electric motor 23, and continuing with the transmission 22, the first electric motor 20 and, finally, the power-splitting planetary gear 21.

In the illustrative embodiment of the present invention as shown in FIG. 4, the second electric motor 23 has a stator 28 fixed to the casing member 14 (see FIG. 1) and a rotor 29, which is rotatably supported on the inner diametric side of the stator 28 (hereinafter, with respect to the position in the radial direction of the casing member 14, the side closer to the center (the axis 13) will be referred to as the "inner diametric side," and the side further from the center will be referred to as the "outer diametric side"). The rotor 29 of the second electric motor 23 is coupled with a sun gear S1 of the transmission 22 (described below). Similar to the first electric motor 20 (described below), the second electric motor 23 is connected to a hybrid driving battery (hereinafter "HV battery") (not shown) via an inverter (not shown). However, the main functions of the first electric motor 20 and the second electric motor 23 differ from each other. For instance, in contrast with the first electric motor 20, which functions mainly for the purpose of power generation, the second electric motor 23 functions mainly as a driving motor for supplementing the motive power (driving force) of the vehicle 1. However, the second electric motor 23 also functions as a generator, for example, by regenerating vehicular inertia force as electrical energy in braking the vehicle.

The transmission 22 comprises a so-called Ravigneaux type planetary gear unit 27 comprising one double pinion planetary gear train and a single planetary gear train that uses one of their pinions in common. The transmission 22 also comprises first and second brakes B1 and B2.

The planetary gear unit 27 comprises two sun gears S1 and S2, a carrier CR1 supporting a pinion P1 and a pinion (common long pinion) P2 and a ring gear R1. Between the two pinions P1 and P2, the pinion P1 engages with the sun gear S1 and the ring gear R1, and the pinion P2, i.e., the common long pinion, engages with the sun gear S2 and the pinion P1. The ring gear R1 of the planetary gear unit 27 is coupled with the first brake B1 and the sun gear S2 is coupled with the second brake B2. As a whole, the sun gear S1, which is an input member, is coupled with the rotor 29 of the second electric motor 23 (described above), and the carrier CR1, which is an output member, is coupled with the output shaft 12 via a carrier CR0 of the power-splitting planetary gear 21 (described below). The transmission 22 is arranged so as to be able to change two deceleration stages where reduction ratios are different by engaging one of the first and second brakes B1 and B2 while releasing the other and by releasing the one while engaging the other. That is, the transmission 22 is arranged so as to change the degree of the motive power inputted from the second electric motor 23 (described above) via the sun gear S1 and to transmit it to the output shaft 12 via the carrier CR1.

In the illustrative and non-limiting embodiment of the present invention shown in FIG. 4, the first electric motor 20 has a stator 24 fixed to the casing member 14 (see FIG. 1) and a rotor 25, which is rotatably supported on the inner diametric side of the stator 24. The rotor 25 of the first electric motor 20 is coupled with the sun gear S0 of the power-splitting planetary gear 21 (described below). The first electric motor 20 generates electricity based on the motive power inputted via the sun gear S0 and charges the HV battery via the inverter.

The power-splitting planetary gear 21 comprises a double pinion planetary gear train disposed coaxially with the output shaft 12. The power-splitting planetary gear 21 has a carrier (third rotary element) CR0 supporting a plurality of pinions P0 (P01 and P02), a sun gear (second rotary element) S0 engaging with the pinion P01, and a ring gear (first rotary element) R0 engaging with the pinion P02. The ring gear R0 of the power-splitting planetary gear 21 is coupled with the input shaft 10, the sun gear S0 is coupled with the rotor 25 of the first electric motor 20 and the carrier CR0 is coupled with the output shaft 12. The power-splitting planetary gear 21 splits the motive power inputted to the ring gear R0 via the input shaft 10 to the first electric motor 20 via the sun gear S0 and to the output shaft 12 via the carrier CR0 based on the control on the revolution of the first electric motor 20. It is noted that the motive power split to the first electric motor 20 is used for generating electricity and the motive power split to the output shaft 12 is used for driving the vehicle 1.

All of four devices of the second electric motor 23, the transmission 22, the first electric motor 20 and the power-splitting planetary gear 21, in the exemplary hybrid driving unit 7B shown in FIG. 4 are disposed on the input shaft 10. The aforementioned devices are linked to each other as follows. The input shaft 10 extends toward the rear side through the inner peripheral side of the second electric motor 23, the transmission 22, the first electric motor 20 and the power-splitting planetary gear 21, and is linked to the ring gear R0 of the power-splitting planetary gear 21 from the rear side thereof. The rotor 29 of the second electric motor 23 extends toward the rear side through the outer peripheral side of the input shaft 10 and the inner peripheral side of the sun gear S2 of the transmission 22 and is linked to the sun gear S1 of the transmission 22. The carrier CR1 of the transmission 22 extends toward the rear side by passing through the part between the outer peripheral side of the input shaft 10 and the inner peripheral side of the first electric motor 20 and the power-splitting planetary gear 21, and is linked to the carrier CR0 of the power-splitting planetary gear 21 from the rear side thereof. The rotor 25 of the first electric motor 20 extends toward the rear side and is linked to the sun gear S0 of the power-splitting planetary gear 21. Then, in the power-splitting planetary gear 21, in which the ring gear R0 is linked to the input shaft 10, the carrier CR0 is linked to the carrier CR1 of the transmission 22, and the sun gear S0 is linked to the rotor 25 of the first electric motor 20 as described above. The front side (the transmission 22 side) of the carrier CR0 is linked to the front end of the output shaft 12 by passing through the outer peripheral side of the ring gear R0 and the rear side of the power-splitting planetary gear 21. The output shaft 12 extends toward the rear side.

As for the longitudinal disposition of the second electric motor 23, the transmission 22, the first electric motor 20 and the power-splitting planetary gear 21 (described above), i.e., the disposition along the axis 13, consistent with the present invention, at least the second electric motor 23 is disposed on the side closer to the front side than the first electric motor 20. Furthermore, in this illustrative and non-limiting embodiment, the second electric motor 23 is disposed on the foremost side (the side closer to the internal combustion engine 5). This allows the hybrid driving unit 7B to have a preferable mountability to the body 4 (as described in detail below).

The operation and effect of the hybrid driving unit 7B, explained with reference to the skeleton view thereof in FIG. 4, will be explained after detailing the structure of the hybrid driving unit 7B with reference to FIG. 5.

Figure 5:
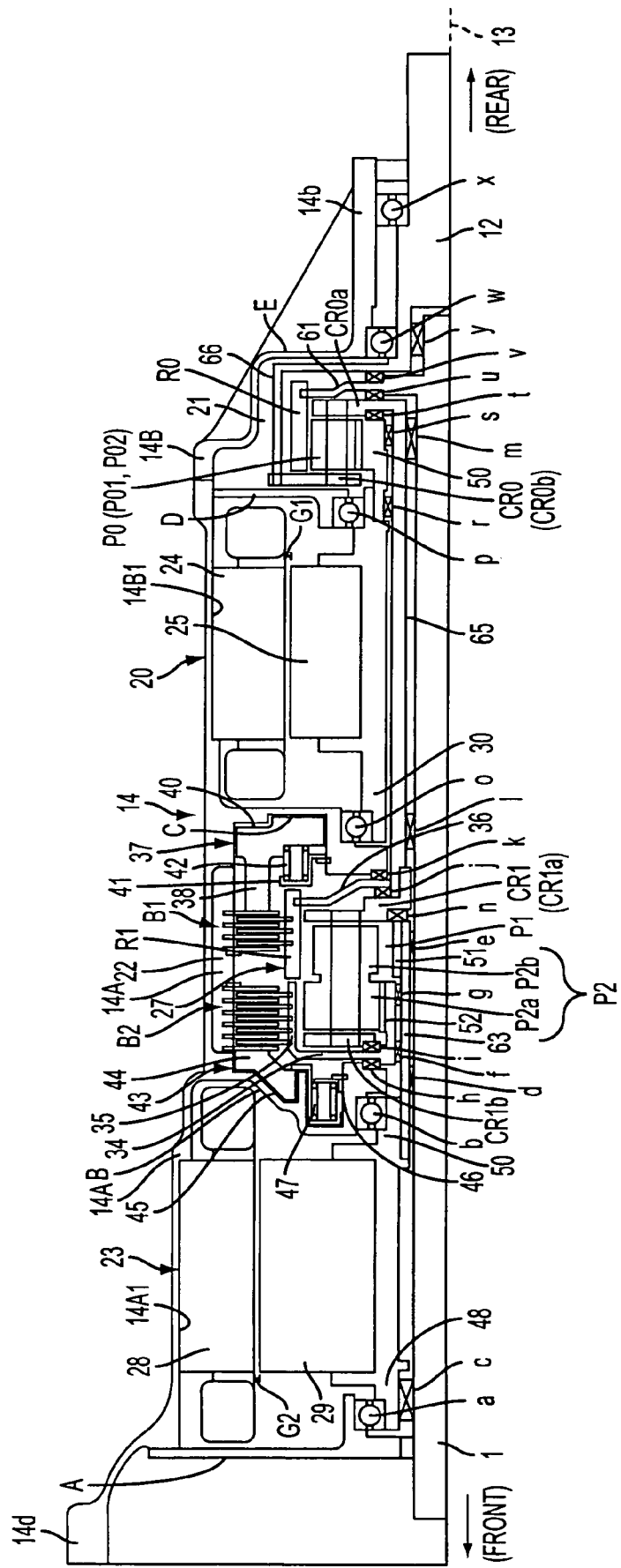
FIG. 5 depicts a longitudinal section view showing the structure of the hybrid driving unit of the second illustrative and non-limiting embodiment of the present invention.

FIG. 5 shows an upper half portion of the longitudinal section view of the hybrid driving unit 7B including the axis 13.

The illustrative hybrid driving unit 7B, as shown in FIG. 5, comprises the input shaft 10 and the output shaft 12 disposed on the axis 13. Further, this exemplary hybrid driving unit 7B, as shown in FIG. 5, comprises the second electric motor 23, the transmission 22, the first electric motor 20 and the power-splitting planetary gear 21 disposed in line, around and along the axis 13. All of the aforementioned devices are stored within the casing member 14, except for a part of the output shaft 12, which is on the rear end and extends out of the casing member 14 toward the rear side.

Taking the readiness of assembly and other considerations into account, the casing member 14 is divided into a plurality of parts in the longitudinal direction along the axis 13 and is formed in a body by combining junctions of the respective parts. In the illustrative and non-limiting embodiment shown in FIG. 5, a front partial case 14A is connected with a rear partial case 14B at the junction H to form the casing member 14. It is noted that in the present illustrative and non-limiting embodiment, the junction H is located near the front end of the power-splitting planetary gear 21, i.e., just behind a partition D (which will be explained below). In the casing member 14, a plurality of partitions (supporting members), i.e., partitions A, B, C, D and E, are formed at different positions in the longitudinal direction in order from the front side. Among these partitions A through E, the partitions A and E are disposed near the front and rear ends of the casing member 14, respectively, and the space within the case between the partitions A and E is divided into four spaces by the partitions B, C and D longitudinally along the axis 13. These partitions A through E act as reinforcing members of the casing member 14 and are used for retaining bearings a through x (described below) and for forming hydraulic chambers 40 and 45 (described below). Among the partitions A through E, the partitions A and D are constructed by mounting, e.g., by bolting, disc-like partitioning members, i.e., a separate member, at the positions indicated in FIG. 5. In one illustrative and non-limiting embodiment of the present invention, the radial dimension of a motor storage section 14A1 between the partitions A and B in the partial case 14A is set to be larger than the radial dimension of a motor storage section 14B1 in the partial case 14B. This improves the mountability in mounting the hybrid driving unit 7B to the FR type vehicle 1.

In the illustrative and non-limiting embodiment of the present invention as shown in FIG. 5, the second electric motor 23, the transmission 22, the first electric motor 20 and the power-splitting planetary gear 21 are stored within the four spaces divided by the partitions A through E, respectively. That is, the second electric motor 23 is stored in the space between the partitions A and B, the transmission 22 is stored between the partitions B and C, the first electric motor 20 is stored between the partitions C and D, and the power-splitting planetary gear 21 is stored between the D and E, respectively. Beginning with the second electric motor 23, these devices will be explained in detail below.

In the illustrative embodiment shown in FIG. 5, the second electric motor 23 comprises an AC permanent magnet synchronous motor (brushless DC motor) and is disposed on the outer diametric side of the input shaft 10 coaxially therewith. The second electric motor 23 comprises the stator 28, which is fixed to the inner peripheral face of the casing member 14, and the rotor 29, which is rotatably disposed on the inner diametric side of the stator 28, apart from the stator 28 by a predetermined air gap G2. The inner diametric side of the rotor 29 is formed in a cylindrical shape and stages 48 and 50 are formed, respectively, at the front and rear outer peripheral faces of the cylindrical part. The rotor 29 is rotatably supported by the casing member 14 through an intermediary of bearings a and b fitted between the stages 48 and 50 and the partitions A and B while being positioned in the longitudinal direction. The rear end of the cylindrical part of rotor 29 is coupled with the sun gear S1 of the transmission 22 (described below) via a sleeve 63 fitted so as to cover the outer peripheral face of the input shaft 10. The input shaft 10 relative-rotatably supports the rotor 29 and the sun gear S1 mutually formed in a body through an intermediary of bearings c, d and e fixed on the outer peripheral face of the input shaft 10. It is noted that the bearings c and d are disposed at positions longitudinally corresponding to the bearings a and b, respectively. Since the rotor 29 of the second electric motor 23 is rotatably supported by the bearings a and b, which are fixed to the partitions A and B as described above, the position of the rotor 29 in the longitudinal and radial directions may be maintained accurately. Accordingly, even if a force that acts on the casing member 14 and bends the casing member 14 in the vertical or lateral direction, the predetermined air gap G2 between the stator 28 and the rotor 29 may be kept accurately. It is noted that the second electric motor 23 is connected to the HV battery via the inverter similarly to the first electric motor 20 (described below).

The input shaft 10 is rotatably supported by the casing member 14 through a bearing c provided at a position axially overlapping with the bearing a, a bearing y provided between the outer peripheral face of the rear end of the input shaft 10 and the cylindrical inner peripheral face of the front end of the output shaft 12, and a bearing w provided between the output shaft 12 and an inner peripheral face of a boss section 14*b* extending toward the rear from the inner diametric side of the partition E at the rear end of the casing member 14.

Consistent with the exemplary embodiment shown in FIG. 5, the transmission 22 is disposed between the partitions B and C of the casing member 14, i.e., at the intermediate position of the casing member 14 in the longitudinal direction (the direction along the axis 13). The transmission 22 has the Ravigneaux type planetary gear unit 27 disposed on the inner diametric side, and the first and second brakes B1 and B2 disposed, respectively, on the rear and front sides on the outer diametric side thereof.

The planetary gear unit 27 comprises a first sun gear S1 (hereinafter simply referred to as "the sun gear S1") a second sun gear S2 (hereinafter simply referred to as "the sun gear S2"), which is disposed on the front side of the sun gear S1 and slightly on the outer diametric side thereof, the ring gear R1, which is disposed on the outer diametric side of the sun gear S1, the pinion P1, which engages with the sun gear S1 and the ring gear R1, the pinion P2, which comprises the common long pinion and engages with the sun gear S2 and the pinion P1, and the carrier CR1, which supports pinions P1 and P2. Beginning with the sun gear S1, the aforementioned parts will be explained below.

The sun gear S1 is coupled with the rear end of the rotor 29 of the second electric motor 23 (described above) via the sleeve 63 (described above). This sun gear S1 is relative-rotatably supported by the input shaft 10 together with the sleeve 63, through the intermediary of the bearings c, d and e, which are fitted to the outer peripheral face of the input shaft 10.

According to the illustrative embodiment shown in FIG. 5, the sun gear S2 is formed in a body with a flange section 34 extending from the front end of the sun gear S2 to the outer diametric side along the front carrier plate CR1*b* of the carrier CR1 and with a drum section 35 extending from the outer diametric end of the flange section 34 toward the rear. The second brake B2 (described below) is interposed between the outer peripheral face of this drum section 35 and an inner peripheral spline 14*a* of the inner peripheral face of the casing member 14. The sun gear S2 is rotatably supported by bearings f and g, which are fitted to the outer peripheral face of the sleeve 63 formed in a body with the sun gear S1 (described above) and by bearings h and i, which are fitted, respectively, to the front and rear faces on the inner diametric side (basal end side) of the flange section 34. It is noted that the bearing h is interposed between the flange section 34 and the inner diametric rear face of the partition B, and the bearing i is interposed between the flange section 34 and the front face on the inner diametric side of the front carrier plate CR1*b* of the carrier CR1 (described below).

The ring gear R1 is provided with a flange section 36, fixed at the rear end thereof and extending toward the inner diametric side along the rear carrier plate CR1*a* of the carrier CR1, and is rotatably supported by bearings j and k, which are fitted to the front and rear faces on the inner diametric side of the flange section 36. The bearing j is interposed between the flange section 36 and the rear side carrier plate CR1*a* of the carrier CR1, and the bearing k is interposed between the flange section 36 and the inner diametric front face of the partition C. The first brake B1 is interposed between the outer peripheral face of the ring gear R1 and the inner peripheral spline 14*a* of the inner peripheral face of the casing member 14 to restrict the movement of the ring gear R1 in the axial direction.

According to the exemplary embodiment shown in FIG. 5, the pinion P1 is rotatably supported by the carrier CR1 and is engaged with the sun gear S1 (described above) on the inner diametric side and is engaged with the ring gear R1 (described above) on the outer diametric side.

The pinion P2 is the common long pinion in which a large-diametric gear P2*a* formed on the front side and a small-diametric gear P2*b* formed on the rear side are combined in a body. In the pinion P2, the large-diametric gear P2*a* is engaged with the sun gear S2 (described above) and the small-diametric gear P2*b* is engaged with the pinion P1 (described above).

The carrier CR1 rotatably supports the pinions P1 and P2 with the front and rear carrier plates CR1*b* and CR1*a*. The rear carrier plate CR1*a* is coupled with the rear carrier plate CR0*a* of the carrier CR0 of the power-splitting planetary gear 21 (described below) via a sleeve 65 extending toward the rear. The front end of sleeve 65 is coupled with the rear carrier plate CR1*a*, the intermediate part thereof passes through the inside of the rotor 25 of the second electric motor 20 (described below), and the rear end thereof is coupled with the rear carrier plate CR0*a* of the power-splitting planetary gear 21. The sleeve 65 is relative-rotatably supported by bearings l and m, which are fitted between the sleeve and the outer peripheral face of the input shaft 10. The carrier CR1 is relative-rotatably supported by the above-mentioned bearing i, which is fitted to the inner diametric front face of the front carrier plate CR1*b*, and by the bearings n and j, which are fitted, respectively, to the inner diametric front and rear faces of the rear carrier plate CR1*a*. It is noted that the bearing n is interposed between the carrier plate CR1*a* and the rear end face of the sun gear S1 (described above).

According to the illustrative and non-limiting embodiment shown in FIG. 5, the first brake B1 comprises a large number of discs and friction plates (brake plates) and is spline-coupled between an outer peripheral spline, which is formed on the outer peripheral face of the ring gear R1 (described above) and the inner spline 14*a*, which is formed on the inner peripheral face of the casing member 14. A hydraulic actuator 37 for the first brake is disposed on the rear side of the first brake B1. The hydraulic actuator 37 comprises a piston 38, which is disposed behind the first brake B1 so as to be movable in the longitudinal direction, a first hydraulic chamber 40, which is provided at the outer diametric front face of the partition C and into which the rear end of the piston 38 is oil-tightly fitted, and a return spring (compression spring) 42 interposed between a retainer 41, which is fixed to the partition C, and the inner diametric front face of the piston 38 to bias the piston 38 to the rear.

The second brake B2 is disposed just before the first brake B1 (described above). The second brake B2 comprises a large number of discs and friction plates (brake plates) and is spline-coupled between an outer peripheral spline, which is formed on the outer peripheral face of the drum section 35 combined with the sun gear S2 (described above) and the inner spline 14*a*, which is formed on the inner peripheral face of the casing member 14. A hydraulic actuator 43 for the second brake is disposed on the front side of the second brake B2. The hydraulic actuator 43 comprises a piston 44, which is disposed before the second brake B2 so as to be movable in the longitudinal direction, a second hydraulic chamber 45, which is provided at the outer diametric rear face of the partition B and into which the front end of the piston 44 is oil-tightly fitted, and a return spring (compression spring) 47 interposed between a retainer 46, which is fixed to the partition B, and the inner diametric rear face of the piston 44 to bias the piston 44 to the front.

According to the exemplary embodiment shown in FIG. 3, in the transmission 22 constructed as described above, an output from the second electric motor 23 is transmitted to the sun gear S1 via the sleeve 63. In a low state, the first brake B1 is engaged and the second brake B2 is released. Accordingly, the ring gear R1 is locked and the sun gear S2 is freely rotatable in this state. The revolution of the sun gear S1 (described above) is extensively reduced via the pinion P1 and is transmitted to the carrier CR1. The revolution of the carrier CR1 is transmitted to the output shaft 12.

When the transmission 22 is in a high state, the first brake B1 is released and the second brake B2 is engaged. Accordingly, the sun gear S2 is locked and the ring gear R1 is freely rotatable in this state. In this state, the revolution of the sun gear S1 is transmitted to the pinion P1 and the pinion P2 engages with the locked sun gear S2. Then, the carrier CR1 moves around the sun gear at a restricted predetermined number of revolutions and the revolution of the carrier CR1 reduced in a relatively small extent is transmitted to the output shaft 12 at this time.

Thus, the transmission 22 transmits the extensively reduced revolution to the output shaft 12 in the low state by engaging the first brake B1 and by releasing the second brake B2, respectively. In contrast, it transmits the revolution reduced in a relatively small extent to the output shaft 12 by releasing the first brake B1 and by engaging the second brake B2, respectively, in the high state. Because the transmission 22 is thus capable of shifting in the two stages, the second electric motor 23 may be downsized. That is, the transmission 22 enables the use of a small electric motor and to transmit sufficient driving torque to the output shaft 12 in the low state in starting the vehicle 1 when high torque is required, and to prevent the rotor 29 from rotating at high-speed by putting it into the high state when the output shaft 12 is rotating at high-speed.

In the illustrative embodiment shown in FIG. 5, the first electric motor 20 comprises, for example, an AC permanent magnet synchronous motor (brushless DC motor). The first electric motor 20 is stored between the partitions C and D and is disposed on the outer diametric side of the input shaft 10 coaxially therewith. The first electric motor 20 comprises the stator 24, which is fixed to the inner peripheral face of the casing member 14, and the rotor 25, which is rotatably disposed on the inner diametric side of the stator 24, apart from the stator 24 by the predetermined air gap G1. The rotor 25 is formed into a cylindrical shape and stages 30 and 31 are formed at the front and rear outer peripheral faces of the cylindrical part. The casing member 14 rotatably supports the rotor 25 through an intermediary of bearings o and p, which are fitted while being positioned in the longitudinal direction between stages 30 and 31 and the partitions C and D. A sun gear S0 of the power-splitting planetary gear 21 (described below) is fixed to the rear end of the cylindrical part. The rotor 25 and the sun gear S0 formed mutually in a body are relative-rotatably supported by the sleeve 65 through the intermediary of bearings q, r and s, which are fixed on the outer peripheral face of the above-mentioned sleeve 65 fitted so as to cover the outer peripheral face of the input shaft 10. It is noted that, as for the longitudinal disposition, the bearings q and r are disposed at positions corresponding to the bearings o and p, respectively. Because the casing member 14 and the sleeve 65 rotatably support the rotor 25 of the first electric motor 20 so as to sandwiched by the bearings o and p, which are fixed to the partitions C and D, and the bearings q and r, which are fixed to the outer peripheral face of the sleeve 65 as described above, the longitudinal and radial positions of the rotor 25 may be assured accurately. Accordingly, even if a force acts on the casing member 14 and bends the casing member 14 in the vertical or horizontal directions, the predetermined air gap G1 between the stator 24 and the rotor 25 may be kept accurately. It is noted that the first electric motor 20 is connected to the HV battery via the inverter as described above. The main function of the first electric motor 20 constructed as described above is to generate electric power based on the power split to the sun gear S0 of the power-splitting planetary gear 21, to drive the second electric motor 23 via the inverter, and to charge the HV battery.

Consistent with the illustrative embodiment shown in FIG. 5, the power-splitting planetary gear 21 is disposed between the partitions D and E of the casing member 14. The power-splitting planetary gear 21 comprises the double pinion planetary gear train disposed coaxially with the input shaft 10 as described above and comprises the ring gear (first rotary element) R0, the sun gear (second rotary element) S0 and the carrier (third rotary element) CR0 supporting the pinions P01 and P02 (note that these are shown together as a pinion P0 in FIG. 5). Among them, the ring gear R0 extends toward the rear and is fixed to the outer diametric end of the flange section 61, which extends from the outer peripheral face near the rear end of the input shaft 10 to the outer diametric side along the carrier CR0. The rear carrier plate CR0$a$ of the carrier CR0 is coupled with the rear end of the sleeve 65 (described above) at the inner diametric side thereof. The front carrier plate CR0$b$ of the carrier CR0 is coupled with the front end of the output shaft 12 via a coupling member 66. The coupling member 66 has a drum portion coupled with the outer diametric end of the front carrier plate CR0$b$ (described above) and extending toward the rear and a flange portion linked to the drum portion and extending toward the inner diametric side along the rear side of the above-mentioned flange section 61. The inner diametric side of the flange portion is coupled with the front end of the output shaft 12.

In the illustrative and non-limiting embodiment shown in FIG. 5, bearings are fitted to the following positions for the power-splitting planetary gear 21. That is, the above-mentioned bearings r and s are fitted between the outer peripheral face on the rear end of the sleeve 65 formed in a body with the rear carrier plate CR0$a$, and the inner peripheral face of the sun gear S0, and the bearing m is fitted between the inner peripheral face on the rear end of the sleeve 65 and the outer peripheral face of the rear end of the input shaft 10. The bearings t and u are fitted between the inner diametric front face of the rear carrier plate CR0$a$ and the rear end face of the sun gear S0, and between the rear face of the rear carrier plate CR0$a$ and the inner diametric front face of the flange section 61, respectively. The bearing v is fitted between the inner diametric rear face of the flange section 61 and the inner diametric front face of the flange portion of the coupling member 66. The aforementioned bearings support the ring gear R0 rotatably with respect to the casing member 14 in a body with the input shaft 10 and the carrier CR0 and the sun gear S0 relative-rotatably with respect to the output shaft 12 and the sleeve 65. Thus, in the power-splitting planetary gear 21, the ring gear R0 which is the input section is fixed to the input shaft 10 via the flange section 61 and the sun gear S0 and the carrier CR0 which are the output sections (to which power is split) are coupled with the rear end of the rotor 25 of the first electric motor 20 and to the front end of the output shaft 12. That is, the power-splitting planetary gear 21 is arranged so as to split the motive power of the internal combustion engine 5 inputted to the ring gear R0 via the input shaft 10 (see FIG. 1) to the side of the first electric motor 20 via the sun gear S0 and to the side of the output shaft 12 via the carrier CR0, respectively. The ratio of split of power is decided based on the state of revolution of the first electric motor 20 (described above). That is, when the rotor 25 of the first electric motor 20 is caused to generate a large power, an amount of power generated by the first electric motor 20 increases and the power outputted to the output shaft 12 is reduced to that extent. When the rotor 25 of the first electric motor 20 is caused to generate a small power in contrast, an amount of power generated by the first electric motor 20 decreases and the power outputted to the output shaft 12 increases to that extent.

The casing member 14 storing the second electric motor 23, the transmission 22, the first electric motor 20 and the power-splitting planetary gear 21 as described above has a boss section 14b which extends toward the rear on the inner diametric side of the partition E at the rear end thereof. The casing member 14 rotatably supports the output shaft 12 by the boss section 14b through an intermediary of bearings w and x.

In the casing member 14, a coupling section 14d at the front end thereof is connected with the internal combustion engine 5, which is rubber-mounted to the body 4 (see FIG. 1), and the rear end thereof is rubber-mounted to a part of the body by utilizing a mounting section provided at an outer diametric part of the partition D.

In the illustrative and non-limiting embodiment of the hybrid driving unit 7B constructed as described above, the motive power inputted to the input shaft 10 is inputted to the ring gear R0 of the power-splitting planetary gear 21 to be distributed (divided) to the sun gear S0 and the carrier CR0, as shown in the skeleton view in FIG. 4. Moreover, the power distributed to the sun gear S0 is inputted to the rotor 25 of the first electric motor 20 to generate electric power. The electric power thus generated is used via an inverter to drive the second electric motor 23 or is used to charge the HV battery. The second electric motor 23, to which the electric power is supplied from the HY battery via the inverter, drives the output shaft 12 via the transmission 22 and the carrier CR0. That is, the power from the internal combustion engine 5 and the power from the second electric motor 23 are combined and outputted to the output shaft 12. It is noted that because the transmission 22 is arranged so as to be able to switch between the high and low states as described above, the power corresponding to the high or low state is outputted to the output shaft 12.

In the illustrative and non-limiting embodiment shown in FIG. 5, the second electric motor 23 is disposed on the side closer to the front (the side closer to the internal combustion engine 5). The casing member 14 is also formed such that the inner diameter of the part in which the stator 28 of the second electric motor 23 is fixed is larger than that of the part in which the stator 24 of the first electric motor 20 is fixed. This allows the second electric motor 23, which, for example, must generate a large torque in accelerating the vehicle 1 at the time of starting, to be constructed so as to have a large radial dimension (as compared to that of the first electric motor 20) and allows the length thereof in the longitudinal direction to be suppressed to that extent, so that the length of the whole hybrid driving unit 7B may be shortened and its mountability to the body 4 may be improved.

It is noted that not only the hydraulic actuator, but also a ball screw mechanism, an electric actuator using an electric motor or other actuators may be used for the first and second brakes B1 and B2 explained in the above embodiments. Furthermore, not only the frictional engaging elements, but also an interlocking type element may be used consistent with the present invention.

In addition, not only the transmission described in the above embodiments may be used, but also an automatic transmission of two, three or more stages, or an automatic transmission having increased speed stages (O/D) and a continuous variable transmission (CVT) may be used for the transmission 22 (described above). Further, the output of the transmission 22 may be linked not only to the output shaft 12 but also to any part of the power train system from the output shaft 12 to the driving wheels.

The above and other features of the invention including various and novel details of construction and combination of parts has been particularly described with reference to the accompanying drawings and pointed out in the claims. It will be understood that the particular construction and combination of parts embodying the invention is shown by way of illustration only and not as a limitation of the invention. The principles and features of this invention may be employed in varied and numerous embodiments without departing from the scope of the invention.

The invention claimed is:

1. A hybrid driving unit comprising:
   an input shaft for inputting motive power from an internal combustion engine;
   an output shaft disposed on an axis in line with said input shaft and engaged with driving wheels;
   a first electric motor disposed on said axis and comprising a stator and a rotor;
   a power-splitting planetary gear disposed on said axis and comprising a first rotary element coupled with said input shaft, a second rotary element coupled with said rotor of said first electric motor and a third rotary element coupled with said output shaft;
   a second electric motor disposed on said axis and comprising a stator and a rotor; and
   a transmission disposed on said axis, which shifts and transmits revolution of said rotor of said second electric motor to said output shaft;
   wherein said first electric motor, said power-splitting planetary gear, said second electric motor and said transmission are provided in a casing member while being disposed in line on said axis;
   wherein said stators of said first and second electric motors are fixed to said casing member;
   wherein said first electric motor, said power-splitting planetary gear, said second electric motor and said transmission are disposed on said axis such that said second electric motor and said transmission are positioned on a side of a vehicle closer to said internal combustion engine than said first electric motor and said power-splitting planetary gear; and
   wherein said transmission is an automatic transmission having at least two stages or a continuous variable transmission.

2. The hybrid driving unit as set forth in claim 1, wherein said second electric motor is disposed in a foremost position in said vehicle among said first electric motor, said power-splitting planetary gear, said second electric motor and said transmission.

3. The hybrid driving unit as set forth in claim 2, wherein said transmission is provided adjacent to said second electric motor.

4. The hybrid driving unit as set forth in claim 2, wherein supporting members extending from said casing member support both sides of said rotor of said second electric motor through an intermediary of bearing members; and
   wherein one of said supporting members, which is between said second electric motor and said transmission, forms a hydraulic chamber of a hydraulic actuator of said transmission.

5. The hybrid driving unit as set forth in claim 4, wherein at least a part of said hydraulic chamber is provided on an inner diametric side of said stator of said second electric motor.

6. The hybrid driving unit as set forth in claim 1, wherein said second electric motor, said transmission, said power-splitting planetary gear and said first electric motor are disposed in order from a side of said vehicle that is closest to said internal combustion engine.

7. The hybrid driving unit as set forth in claim 6, wherein said input shaft passes through an inner peripheral side of said second electric motor and said transmission;
   wherein said input shaft is coupled with a ring gear;
   wherein said output shaft passes through an inner peripheral side of said power-splitting planetary gear and said first electric motor; and
   wherein said output shaft is coupled with an output element of said transmission through an outer peripheral side of said power-splitting planetary gear.

8. The hybrid driving unit as set forth in claim 7, wherein said power-splitting planetary gear comprises a double pinion planetary gear train;
   wherein said input shaft passes between said transmission and said power-splitting planetary gear;
   wherein said input shaft is coupled with a ring gear of said double pinion planetary gear train;
   wherein said output shaft is coupled with a carrier of said double pinion planetary gear train on a side of said transmission through the inner peripheral side of said power-splitting planetary gear;
   wherein said rotor of said first electric motor is coupled with a sun gear of said double pinion planetary gear train; and
   wherein said output element of said transmission is coupled with said carrier of said double pinion planetary gear train on a side of said first electric motor through an outer peripheral side of said power-splitting planetary gear.

9. The hybrid driving unit as set forth in claim 7, wherein supporting members extending from said casing member support both sides of said rotor of said first electric motor through an intermediary of bearing members; and
   wherein said output shaft is supported by an inner peripheral surface of said rotor of said first electric motor through an intermediary of bearing members provided at an outer peripheral surface of said output shaft.

10. The hybrid driving unit as set forth in claim 9, wherein said supporting members extending from said casing member support both sides of said rotor of said second electric motor through an intermediary of bearing members and said input shaft is supported by an inner peripheral surface of said rotor of said second electric motor through an intermediary of bearing members provided at an outer peripheral surface of said input shaft.

11. The hybrid driving unit as set forth in claim 1, wherein said second electric motor, said transmission, said first electric motor and said power-splitting planetary gear are disposed in order from a side of the vehicle closest to said internal combustion engine.

12. The hybrid driving unit as set forth in claim 11, wherein said input shaft passes through an inner peripheral side of said second electric motor, said transmission, said first electric motor and said power-splitting planetary gear;
   wherein said input shaft is coupled with said first rotary element;
   wherein said output shaft passes through an outer peripheral side of said power-splitting planetary gear;
   wherein an output element of said transmission passes through an inner peripheral side of said first electric motor and said power-splitting planetary gear; and
   wherein said output element is coupled with said output shaft.

13. The hybrid driving unit as set forth in claim 12, wherein said power-splitting planetary gear comprises a double pinion planetary gear train;
   wherein said input shaft is coupled with a ring gear of said double pinion planetary gear train through a back side of said power-splitting planetary gear;
   wherein said output shaft is coupled with said carrier of said double pinion planetary gear train on a side of said first electric motor;
   wherein said rotor of said first electric motor is coupled with said sun gear of said double pinion planetary gear train; and
   wherein said output element of said transmission is coupled with the rear side of said carrier of said double pinion planetary gear train through the inner peripheral side of said power-splitting planetary gear.

14. The hybrid driving unit as set forth in claim 11, wherein supporting members extending from said casing member support both sides of said rotor of said first electric motor through an intermediary of bearing members; and
   wherein an output element of said transmission is supported by an inner peripheral surface of said rotor of said first electric motor through an intermediary of bearing members provided on an outer peripheral surface thereof.

15. The hybrid driving unit as set forth in claim 11, wherein supporting members extending from said casing member support both sides of said rotor of said second electric motor through an intermediary of bearing members; and
   wherein said input shaft is supported by an inner peripheral surface of said rotor of said second electric motor and by an inner peripheral surface of an output element of said transmission through an intermediary of bearing members provided on an outer peripheral surface of said input shaft.

16. The hybrid driving unit as set forth in claim 15, wherein one of said supporting members between said second electric motor and said transmission, forms a hydraulic chamber of a hydraulic actuator of said transmission.

17. The hybrid driving unit as set forth in claim 1, wherein said transmission comprises a planetary gear unit.

18. The hybrid driving unit as set forth in claim 17, wherein said transmission comprises at least four shifting elements;
   wherein a first shifting element is coupled with said rotor of said second electric motor;
   wherein a second shifting element is coupled with said output shaft; and
   wherein said transmission comprises braking elements which are capable of fixing a third shifting element and a fourth shifting element to said casing member.

19. The hybrid driving unit as set forth in claim 17, wherein said planetary gear unit of said transmission comprises a Ravigneaux type planetary gear; and
   wherein a carrier of said Ravigneaux type planetary gear is coupled with said output shaft.

20. The vehicle according to claim 1, wherein said transmission comprises plural shifting elements and frictional engaging elements connected to said shifting elements;
   wherein said second electric motor is disposed in a foremost position in said vehicle among said first electric motor, said power-splitting planetary gear, said second electric motor and said transmission; and wherein said transmission is provided adjacent to said second electric motor.

21. A vehicle comprising:
an internal combustion engine;
a hybrid driving unit; and
driving wheels to which a driving force is transmitted from said hybrid driving unit;
wherein said hybrid driving unit comprises:
an input shaft for inputting motive power from said internal combustion engine;
an output shaft disposed on an axis in line with said input shaft and engaged with driving wheels;
a first electric motor disposed on said axis and comprising a stator and a rotor;
a power-splitting planetary gear disposed on said axis and comprising a first rotary element coupled with said input shaft, a second rotary element coupled with said rotor of said first electric motor and a third rotary element coupled with said output shaft;
a second electric motor disposed on said axis and comprising a stator and a rotor; and
a transmission disposed on said axis which shifts and transmits a revolution of said rotor of said second electric motor to said output shaft;
wherein said first electric motor, said power-splitting planetary gear, said second electric motor and said transmission are provided in a casing member while being disposed in line on said axis;
wherein said stators of said first and second electric motors are fixed to said casing member;
wherein said first electric motor, said power-splitting planetary gear, said second electric motor and said transmission are disposed on said axis such that said second electric motor and said transmission are positioned on a side of a vehicle closer to said internal combustion engine than said first electric motor and said power-splitting planetary gear; and
wherein said transmission is an automatic transmission having at least two stages or a continuous variable transmission.

22. The vehicle according to claim 21, wherein said input shaft is coupled with a crankshaft of said internal combustion engine;
wherein a propeller shaft is coupled with said output shaft; and
wherein said crankshaft, said input shaft, said output shaft and said propeller shaft are disposed approximately on the same axial line.

23. A hybrid driving unit comprising:
an input shaft for inputting motive power from an internal combustion engine;
an output shaft disposed on an axis in line with said input shaft and engaged with driving wheels;
a first electric motor disposed on said axis and comprising a stator and a rotor;
a power-splitting planetary gear disposed on said axis and comprising a first rotary element coupled with said input shaft, a second rotary element coupled with said rotor of said first electric motor, a third rotary element coupled with said output shaft, and a double pinion planetary gear train, the double pinion planetary gear train comprising a ring gear coupled with the input shaft, a sun gear coupled with the rotor of the first electric motor and a carrier coupled with the output shaft;
a second electric motor disposed on said axis and comprising a stator and a rotor; and
a transmission disposed on said axis, which shifts and transmits revolution of said rotor of said second electric motor to said output shaft;
wherein said first electric motor, said power-splitting planetary gear, said second electric motor and said transmission are provided in a casing member while being disposed in line on said axis;
wherein said stators of said first and second electric motors are fixed to said casing member;
wherein said first electric motor, said power-splitting planetary gear, said second electric motor and said transmission are disposed on said axis such that said second electric motor and said transmission are positioned on a side of a vehicle closer to said internal combustion engine than said first electric motor and said power-splitting planetary gear; and
wherein said transmission is an automatic transmission having at least two stages or a continuous variable transmission.

* * * * *